(12) United States Patent
Wakabayashi et al.

(10) Patent No.: US 11,806,692 B2
(45) Date of Patent: Nov. 7, 2023

(54) METHOD FOR PRODUCING WATER-ABSORBING AGENT

(71) Applicant: NIPPON SHOKUBAI CO., LTD., Osaka (JP)

(72) Inventors: Ryota Wakabayashi, Himeji (JP); Mai Sato, Himeji (JP); Motohiro Imura, Himeji (JP); Tokio Shuto, Suita (JP); Yoshihiro Shobo, Himeji (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 392 days.

(21) Appl. No.: 16/311,620

(22) PCT Filed: Jun. 20, 2017

(86) PCT No.: PCT/JP2017/022605
§ 371 (c)(1),
(2) Date: Dec. 19, 2018

(87) PCT Pub. No.: WO2017/221911
PCT Pub. Date: Dec. 28, 2017

(65) Prior Publication Data
US 2019/0201868 A1 Jul. 4, 2019

(30) Foreign Application Priority Data
Jun. 20, 2016 (JP) .................. 2016-121545

(51) Int. Cl.
| B01J 20/26 | (2006.01) |
| B01J 20/28 | (2006.01) |
| B01J 20/30 | (2006.01) |
| C08J 3/12 | (2006.01) |
| C08J 3/24 | (2006.01) |
| C08K 5/19 | (2006.01) |

(52) U.S. Cl.
CPC ............ B01J 20/267 (2013.01); B01J 20/26 (2013.01); B01J 20/28016 (2013.01); B01J 20/30 (2013.01); B01J 20/3021 (2013.01); B01J 20/3085 (2013.01); C08J 3/12 (2013.01); C08J 3/24 (2013.01); C08J 3/245 (2013.01); B01J 2220/68 (2013.01); C08J 2333/02 (2013.01); C08K 5/19 (2013.01)

(58) Field of Classification Search
CPC ............ B01J 20/267; B01J 20/28016; B01J 20/3021; B01J 20/3085; C08J 3/245; C08J 3/12
See application file for complete search history.

(56) References Cited

U.S. PATENT DOCUMENTS

| 4,093,776 A | 6/1978 | Aoki et al. |
| 4,893,999 A | 1/1990 | Chmelir et al. |
| 5,945,495 A * | 8/1999 | Daniel .................... C08J 3/075 526/317.1 |
| 6,107,358 A * | 8/2000 | Harada ..................... C08F 2/10 521/133 |
| 6,565,768 B1 | 5/2003 | Dentler et al. |
| 6,987,151 B2 | 1/2006 | Gartner et al. |
| 7,183,456 B2 | 2/2007 | Hatsuda et al. |
| 7,265,190 B2 | 9/2007 | Dairoku et al. |
| 7,638,570 B2 | 12/2009 | Torii et al. |
| 2013/0026412 A1 | 1/2013 | Machida et al. |
| 2016/0024332 A1 | 1/2016 | Loick et al. |
| 2018/0298132 A1* | 10/2018 | Yorino .................... A61L 15/00 |

FOREIGN PATENT DOCUMENTS

| CN | 107709415 A | 2/2018 |
| EP | 3312218 A1 | 4/2018 |
| JP | H08-134134 A | 5/1996 |
| JP | H10-114801 A | 5/1998 |
| JP | 2001-213914 A | 8/2001 |
| JP | 2006-160774 A | 6/2006 |
| JP | 2007-071415 A | 3/2007 |
| JP | 2016-030832 A | 3/2016 |
| WO | WO 00/22017 A1 | 4/2000 |
| WO | WO 2011/126079 A1 | 10/2011 |

OTHER PUBLICATIONS

CN 107709415 A, US2018/0298132 A1.
JP 2016-030832 A, US-2016/0024332 A1.
WO 00/22017 A1, U.S. Pat. No. 6,565,768 B1.
WO 2011/126079 A1, US-2013/0026412 A1.
JP H10-114801 A, U.S. Pat. No. 6,107,358 A.
International Search Report dated Aug. 29, 2017, which issued in corresponding Patent Application No. PCT/JP2017/022605.

* cited by examiner

Primary Examiner — Yong L Chu
(74) Attorney, Agent, or Firm — Dickinson Wright PLLC

(57) ABSTRACT

[Object] To provide a method for efficiently producing a water-absorbing agent having excellent physical properties. [Solution] The method for producing a water-absorbing agent includes a drying step of drying a particulate cross-linked hydrogel polymer containing a drying aid. The drying aid is (a) a compound having a betaine structure and having a long-chain alkyl group having 8 or more carbon atoms, one quaternary nitrogen, and one acid group within a molecule thereof and/or (b) a compound having a long-chain alkyl group having 8 or more carbon atoms, one tertiary nitrogen, and one or more acid groups within a molecule thereof. An addition amount of the drying aid with respect to a gel solid content of the particulate crosslinked hydrogel polymer is 0.001% by mass to 0.5% by mass. In this production method, surface-crosslinking is performed on water-absorbent resin powder obtained through the drying step.

11 Claims, No Drawings

METHOD FOR PRODUCING WATER-ABSORBING AGENT

TECHNICAL FIELD

The present invention relates to methods for producing a water-absorbing agent. More specifically, the present invention relates to methods for efficiently producing a water-absorbing agent having excellent physical properties.

BACKGROUND ART

A water-absorbent resin (SAP/Super Absorbent Polymer) is a water-swellable and water-insoluble polymer gelling agent, and is frequently used in various fields of absorbent articles such as disposable diapers, sanitary napkins, water retention agents for agricultural and horticultural use, and water stopping materials for industrial use.

For the water-absorbent resin, many monomers and hydrophilic polymers are used as the raw materials thereof, and the most industrially produced is, from the viewpoint of water absorption performance, a polyacrylic acid (salt)-based water-absorbent resin in which acrylic acid and/or a salt thereof is used as a monomer.

For the purpose of improvement of performance of disposable diapers, which are a main application of the water-absorbent resin, the water-absorbent resin is required to have various functions. Specifically, the water-absorbent resin is required to have water absorption performance such as water absorption capacity under no load and water absorption capacity under load, which are basic physical properties.

Such a water-absorbent resin can be made into various forms such as sheet form, fiber form, film form, but are generally often made into powder form or particle form. Regarding a water-absorbent resin in powder form or particle form, it is known that the water absorption performance, the handleability, and the feeling during use vary depending on the particle diameter, the particle size distribution, or the like thereof. Furthermore, in the case where a water-absorbent resin is used as an absorbent body for absorbent articles such as disposable diapers improvement in urine leakage, skin rash, and appearance (color tone) and the like, are highly demanded in the market.

Examples of a main method for producing the water-absorbent resin in powder form or particle form include an aqueous solution polymerization method and a reverse phase suspension polymerization method. In each of these production methods, it is necessary to dry a crosslinked hydrogel polymer obtained by polymerization. A lot of energy and time are required for the drying, and thus improving making the drying step efficient is important for improving the productivity of the water-absorbent resin. Furthermore, in the drying step, the particulate crosslinked hydrogel polymer is heated and may be thermally deteriorated. As a result, an adverse effect is often caused on the physical properties of an obtained water-absorbent resin, in particular, on the appearance (color tone) thereof. Thus, making the drying step efficient is also important for the physical properties of the water-absorbent resin.

Under such circumstances, techniques to make the drying step efficient have been proposed. For example, the following methods have been proposed: a method in which a surfactant is added to a particulate crosslinked hydrogel polymer and the particulate crosslinked hydrogel polymer is dried (Patent Literature 1); a method in which an adhesion prevention processing aid is used before and/or while the drying step is performed (Patent Literature 2); a method in which two drying aids having specific physical properties (a low-melting-point drying aid, a high-melting-point drying aid) are mixed and ventilation drying is performed (Patent Literature 3); a method in which a crosslinked hydrogel polymer and a drying aid are mixed and dried in a suspended state (Patent Literature 4); a method in which inorganic particles and a surfactant are mixed into a crosslinked hydrogel polymer that has not been dried, and the crosslinked hydrogel polymer is dried (Patent Literature 5); and a method in which a separating agent such as a surfactant is sprayed before belt drying (Patent Literature 6).

CITATION LIST

Patent Literature

Patent Literature 1: JPH8-134134
Patent Literature 2: JP2016-30832
Patent Literature 3: JP2006-160774
Patent Literature 4: JP2007-071415
Patent Literature 5: JP2001-213914
Patent Literature 6: WO2000/22017

SUMMARY OF THE INVENTION

Problems to be Solved by the Invention

The modifications in the drying step in the above conventional art are still insufficient. For example, with a conventional drying step, an obtained dried polymer may be in block form due to aggregation or agglomeration of a crosslinked hydrogel polymer. Thus, a load in a pulverization step after drying is increased, and there is also a problem that a large amount of fine powder that is not a target is generated in the pulverization step. Therefore, adding a drying aid for the purpose of inhibiting aggregation or agglomeration during drying has been proposed. However, in the drying methods described in Patent Literature 1 to 6, it turned out that the added drying aid decreases the physical properties of the water-absorbent resin after surface-crosslinking. A method for more efficiently producing a water-absorbent resin having excellent physical properties demanded in the market has not been proposed yet.

A crosslinked hydrogel polymer has a high moisture content, and thus a lot of energy and time are required for drying the crosslinked hydrogel polymer. In addition, heating and stirring for a long time can thermally and physically damage the crosslinked hydrogel polymer. Thus, the drying step for the crosslinked hydrogel polymer is a factor for decreasing the productivity and the quality of a water-absorbing agent as a final product.

An object of the present invention is to provide a method for efficiently producing a water-absorbent resin having excellent physical properties.

Solution to the Problems

As a result of conduction various examinations for achieving the above object, the present inventors have found that drying efficiency can be enhanced, while the physical properties (quality) of a water-absorbing agent after surface-crosslinking are maintained high, by drying a crosslinked hydrogel polymer containing a specific compound (drying aid) in a specific amount, and have completed the production method of the present invention. Specifically, the present inventors have found that by adding a later-described specific drying aid to a crosslinked hydrogel polymer, aggregation and/or agglomeration of the crosslinked hydrogel polymers during drying is inhibited, so that the drying efficiency improves. In the specification of the present application, an effect of inhibiting aggregation and/or agglomeration of crosslinked hydrogel polymers is referred to as "gel dispersibility". It has been found that, regarding the specific drying aid, high gel dispersibility is exhibited with a small addition amount of the specific drying aid, and thus a deterioration in the physical properties of a water-absorbing agent due to the addition can be effectively inhibited.

Specifically, in order to achieve the above object, the present inventors provide a method for producing a water-absorbing agent, the method including a drying step of drying a particulate crosslinked hydrogel polymer containing a drying aid, wherein the drying aid is (a) a compound having a betaine structure and having a long-chain alkyl group having 8 or more carbon atoms, one quaternary nitrogen, and one acid group within a molecule thereof and/or (b) a compound having a long-chain alkyl group having 8 or more carbon atoms, one tertiary nitrogen, and one or more acid groups within a molecule thereof, an addition amount of the drying aid with respect to a gel solid content of the particulate crosslinked hydrogel polymer is 0.001% by mass to 0.5% by mass, and surface-crosslinking is performed on water-absorbent resin powder obtained through the drying step.

In addition, by drying an intermediate composition of a water-absorbent resin containing the drying aid and a particulate crosslinked hydrogel polymer, the drying efficiency for the particulate crosslinked hydrogel polymer improves, and thermal and physical loads in a drying step are reduced. As a result, it is found that the productivity and the quality of a water-absorbing agent as a final product produced through the intermediate composition of the water-absorbent resin can be improved.

Specifically, in order to achieve the above object, the present inventors provide an intermediate composition of a water absorbent resin, the intermediate composition containing a drying aid that is (a) a compound having a betaine structure and having a long-chain alkyl group having 8 or more carbon atoms, one quaternary nitrogen, and one acid group within a molecule thereof and/or (b) a compound having a long-chain alkyl group having 8 or more carbon atoms, one tertiary nitrogen, and one or more acid groups within a molecule thereof; and a particulate crosslinked hydrogel polymer, wherein a contained amount of the drying aid with respect to a gel solid content of the particulate crosslinked hydrogel polymer is 0.001% by mass to 0.5% by mass.

Advantageous Effects of the Invention

With the production method according to the present invention, aggregation and/or agglomeration of the particulate crosslinked hydrogel polymer is effectively inhibited by a small amount of the drying aid having the specific structure. Therefore, the drying efficiency in the drying step improves. Furthermore, a load during pulverization in the pulverization step is reduced, and generation of fine powder that is not a target is effectively inhibited. As a result, the physical properties (quality) of a finally obtained product such as a water-absorbing agent improve.

DESCRIPTION OF EMBODIMENTS

The following will describe in detail the present invention. However, the scope of the present invention is not limited to the following description, and the present invention may be carried out by making modifications as appropriate without impairing the gist of the present invention, in addition to the following examples. Moreover, the present invention is not limited to the following embodiments, and various modifications may be made within the scope indicated by the claims. Another embodiment achieved by combining, as appropriate, each technical means disclosed in a plurality of embodiments is also included within the technical scope of the present invention.

[1] Definition of Terms

[1-1] "Water-Absorbent Resin", "Water-Absorbent Resin Powder", "Water-Absorbent Resin Particles", and "Water-Absorbing Agent"

The term "water-absorbent resin" in the present application refers to a water-swellable and water-insoluble polymer gelling agent that satisfies the following physical properties. That is, "water-absorbent resin" refers to a polymer gelling agent whose CRC (centrifuge retention capacity) defined by ERT441.2-02 as water swellability is not less than 5 g/g and whose Ext (water-soluble content) defined by ERT470.2-02 as water insolubility is not greater than 50% by mass.

The water-absorbent resin can be designed in accordance with the application and/or purpose thereof. The water-absorbent resin is preferably a hydrophilic crosslinked polymer obtained by crosslinking and polymerizing an unsaturated monomer having a carboxyl group. The water-absorbent resin is not limited to a resin entirely composed of a crosslinked polymer. The water-absorbent resin may be a composition containing an additive and the like as long as each of the above physical properties (CRC, Ext) satisfies the above numerical range.

The water-absorbent resin includes "a polymer in which only an internal portion is crosslinked, that is, a polymer in which the crosslinking densities of an internal portion and a surface portion of the water-absorbent resin are substantially equal to each other" and "a polymer in which an internal portion and a surface portion are crosslinked, that is, a polymer in which the crosslinking density of a surface portion of the water-absorbent resin is relatively higher than the crosslinking density of an internal portion of the water-absorbent resin". In the present application, for the sake of convenience, a polymer in which only an internal portion is crosslinked is referred to as "water-absorbent resin, powder", and a polymer in which an internal portion and a surface portion are crosslinked is referred to as "water-absorbent resin particles". The term "surface portion" refers to a portion several tens of micrometers from the surface of the water absorbent resin to the inside.

The term "water-absorbing agent" in the present application refers to a water-absorbent resin that can be shipped as a final product. In the case of directly shipping the "water-absorbent resin powder" or the "water-absorbent resin particles" as a final product, the water-absorbent resin powder or the water-absorbent resin particles are the "water-absorbing agent". Even in the case of directly shipping, as a final product, a composition obtained by adding an additive to the water-absorbent resin powder or the water-absorbent resin particles, the composition is referred to as "water-absorbing agent".

[1-2] "Polyacrylic Acid (Salt)"

The term "polyacrylic acid (salt)" in the present application means a polyacrylic acid and/or a salt thereof. Specifically, the term "polyacrylic acid (salt)" means a crosslinked polymer that contains a repeating unit of acrylic acid and/or a salt thereof (hereinafter referred to as "acrylic acid (salt)") as a main component and that contains a graft component as an optional component.

The term "main component" means that the used amount (contained amount) of the acrylic acid (salt) with respect to the entire monomer to be used in polymerization is preferably 50% by mole to 100% by mole, more preferably 70% by mole to 100% by mole, further preferably 90% by mole to 100% by mole, and particularly preferably substantially 100% by mole.

The term "polyacrylic acid salt" as a crosslinked polymer includes preferably a monovalent salt, more preferably an alkali metal salt or an ammonium salt, further preferably an alkali metal salt, particularly preferably a sodium salt.

[1-3] "EDANA" and "ERT"

The term "EDANA" is an abbreviation for the European Disposables and Nonwovens Associations, and the term "ERT" is an abbreviation for EDANA Recommended Test Methods. The ERT is a European standard for measuring methods for physical properties of water-absorbent resin. In the present application, unless otherwise specified, physical properties of the water-absorbent resin are measured according to the ERT original text (revised in 2002).

[1-3-1] "CRC" (ERT441.2-02)

The term "CRC" is an abbreviation for Centrifuge Retention Capacity, and means the water absorption capacity of the water-absorbent resin under no load. Specifically, CRC refers to a water absorption capacity (unit: g/g) measured after 0.2 g of the water-absorbent resin put in a nonwoven fabric bag is immersed in a large excess of a 0.9% by mass sodium chloride aqueous solution for 30 minutes to be freely swollen and then dehydrated using a centrifuge (250 G) for 3 minutes.

[1-3-2] "AAP" (ERT442.2-02)

The term "AAP" is an abbreviation for Absorption Against Pressure, and means the water absorption capacity of the water-absorbent resin under load. Specifically, AAP refers to a water absorption capacity (unit: g/g) measured after 0.9 g of the water-absorbent resin is swollen in a large excess of a 0.9% by mass sodium chloride aqueous solution for 1 hour under a load of 2.06 kPa (21 g/cm$^2$, 0.3 psi). Although "Absorption Under Pressure" is described in ERT442.2-02, AAP is substantially the same as "Absorption Under Pressure".

[1-3-3] "Ext" (ERT470.2-02)

The term "Ext" is an abbreviation for Extractables, and means the water-soluble content (water-soluble component amount) of the water-absorbent resin. Specifically, Ext refers to the amount (unit: % by mass) of substances dissolved in 200 ml of a 0.9% by mass sodium chloride aqueous solution after 1.0 g of the water-absorbent resin is put into the aqueous solution and the aqueous solution is stirred at 500 rpm for 16 hours. For measuring the water-soluble content, pH titration is used.

[1-3-4] "Moisture Content" (ERT430.2-02)

The term "Moisture Content" means the moisture content of the water-absorbent resin. Specifically, the moisture content refers to a value (unit: % by mass) calculated from a drying loss when 4.0 g of the water absorbent resin is dried at 105° C. for 3 hours. The moisture content may be measured with the amount of the water-absorbent resin changed to 1.0 g and with the drying temperature changed to 180° C.

[1-3-5] "PSD" (ERT420.2-02)

The term "PSD" is an abbreviation for Particle Size Distribution, which means the particle size distribution of the water-absorbent resin measured by sieve classification.

A mass-average particle diameter (D50) and the logarithmic standard deviation (σζ) of the particle size distribution are measured by the methods described in U.S. Pat. No. 7,638,570.

[1-4] Others

In the present application, "X to Y" indicating a range means "not less than X and not greater than Y". Unless otherwise noted, the mass unit "t (ton)" refers to "metric ton", and "ppm" refers to "ppm by mass" or "ppm by weight". Furthermore, "mass" and "weight", "part(s) by mass" and "part(s) by weight", and "% by mass" and "% by weight" are synonymous with each other. Moreover, ". . . acid (salt)" means ". . . acid and/or a salt thereof", and "(meth)acrylic" means "acrylic and/or methacrylic".

[2] Method for Producing Water-Absorbing Agent

The following will describe each production step of a preferable method for producing the water-absorbing agent according to the present invention.

[2-1] Monomer Aqueous Solution Preparation Step

This step is a step of preparing an aqueous solution that contains an acrylic acid (salt) as a main component (hereinafter referred to as "monomer aqueous solution"). The term "main component" means that the used amount (contained amount) of the acrylic acid (salt) with respect to the entire monomer to be subjected to a polymerization reaction is normally not less than 50% by mole, preferably not less than 70% by mole, more preferably not less than 80% by mole, and further preferably not less than 90% by mole (the upper limit is 100% by mole). A slurry liquid of the monomer can be used as long as the water absorption performance of the water-absorbing agent obtained as a final product is not decreased. In this section, for the sake of convenience, the monomer aqueous solution will be described.

(Monomer)

In the method for producing the water-absorbing agent according to the present invention, the monomer to be used only needs to be a compound that can be polymerized into a water-absorbent resin. Examples of the monomer include: anionic functional group-containing unsaturated monomers or salts thereof such as (meth)acrylic acid, maleic acid (anhydride), itaconic acid, cinnamic acid, vinylsulfonic acid, allyltoluene sulfonic acid, vinyltoluene sulfonic acid, styrene sulfonic acid, 2-(meth)acrylamide-2-methylpropane sulfonic acid, 2-(math)acryloylethane sulfonic acid, 2-(meth)acryloylpropane sulfonic acid, and 2-hydroxyethyl (meth)acryloyl phosphate; amide group-containing unsaturated monomers such as (meth)acrylamide, N-ethyl(meth) aorylamide, and N,N-dimethyl(meth)acrylamide; amino group-containing unsaturated monomers such as N,N-dimethylaminoethyl(meth)acrylate, N,N-dimethylaminopropyl (meth)acrylate, and N,N-dimethylaminopropyl(meth)acrylamide; mercapto group-containing unsaturated monomers; phenolic hydroxyl group-containing unsaturated monomers; lactam group-containing unsaturated monomers such as N-vinylpyrrolidone and the like.

Among them, from the viewpoint of the water absorption performance of the obtained water-absorbing agent, the monomer to be used is preferably an anionic functional group-containing unsaturated monomer or a salt thereof, more preferably (meth)acrylic acid (salt), maleic acid (anhydride) (salt), itaconic acid (salt), or cinnamic acid (salt), and further preferably acrylic acid (salt).

When a monomer having an acid group, such as a carboxyl group and the like, as an anionic functional group (hereinafter, referred to as "acid group-containing monomer") is used, the monomer is preferably a partially neutralized salt obtained by neutralizing a part of the acid group, from the viewpoint of the water absorption performance of the obtained water-absorbing agent. In this case, the salt is preferably at least one monovalent salt selected from an alkali metal salt, an ammonium salt, and an amine salt, more preferably an alkali metal salt, further preferably at least one salt selected from a sodium salt, a lithium salt, and a potassium salt, and particularly preferably a sodium salt.

From the viewpoint of the water absorption performance of the obtained water-absorbing agent, the neutralization ratio of the partially neutralized salt with respect to the acid group of the acid group-containing monomer is preferably not less than 40% by mole, more preferably 40% by mole to 80% by mole, further preferably 45% by mole to 78% by mole, and particularly preferably 50% by mole to 75% by mole.

The adjustment of the neutralization ratio may be performed before initiation of a polymerization reaction of the acid group-containing monomer, may be performed during a polymerization reaction of the acid group-containing monomer, or may be performed on a crosslinked hydrogel polymer obtained after end of the polymerization reaction of the acid group-containing monomer. In addition, the neutralization ratio may be adjusted at any one stage selected from among before initiation of the polymerization reaction; during the polymerization reaction; and after end of the polymerization reaction, or the neutralization ratio may be adjusted at a plurality of stages among them. In the case where the water-absorbing agent, which is a final product, is used for application to absorbent articles such as disposable diapers and the like, in which there is a possibility of direct contact with a human body, a method in which the neutralization ratio is not adjusted after the end of the polymerization reaction is preferable.

In the method according to the present invention, any of the monomers described above as examples may be used solely, or any two or more of the monomers may be mixed as appropriate and used. In addition, another monomer may be further mixed as long as the object of the present invention is achieved.

(Internal Crosslinking Agent)

In the method for producing the water-absorbing agent according to the present invention, the monomer aqueous solution may contain an internal crosslinking agent as necessary. As the internal crosslinking agent, a known one can be used. Examples of the internal crosslinking agent include N,N'-methylene bis(meth)acrylamide, (poly) ethylene glycol di(meth)acrylate, poly)propylene glycol di(meth)acrylate, trimethylol propane tri(meth)acrylate, glycerin tri (meth)acrylate, glycerin acrylate methacrylate, ethylene oxide-modified trimethylol propane tri(meth)acrylate, pentaerythritol hexa(meth)acrylate, triallyl cyanurate, triallyl isocyanurate, triallyl phosphate, triallylamine, poly(meth) allyloxy alkane, (poly)ethylene glycol diglycidyl ether, glycerol diglycidyl ether, ethylene glycol, polyethylene glycol, propylene glycol, glycerin, 1,4-butanediol, pentaerythritol, ethylenediamine, ethylene carbonate, propylene carbonate, polyethyleneimine, glycidyl (meth)acrylate, and the like. One or more of these internal crosslinking agents can be used in consideration of reactivity. Among them, a compound having two or more polymerizable unsaturated groups within one molecule thereof is preferably used.

In the case where two or more internal crosslinking agents are used in combination, the internally crosslinked structure can be changed by changing the reactivity of the functional groups thereof. Therefore, internal crosslinking agents having different functional groups selected from among the above compounds, such as amide compounds, (meth)acrylate compounds, allyl compounds, amine compounds, imine compounds, alcohol compounds, carbonate compounds, glycidyl compounds, and the like, are preferably used.

The used amount of the internal crosslinking agent with respect to the entire monomer is preferably 0.001% by mole to 5% by mole and more preferably 0.005% by mole to 3% by mole. In addition, in the case where two or more internal crosslinking agents are used in combination, the used amount of each internal crosslinking agent with respect to the entire monomer is preferably 0.001% by mole to 5% by mole and more preferably 0.005% by mole to 3% by mole.

By setting the used amount of the internal crosslinking agent within the above range, a water-absorbing agent having desired water absorption performance is obtained. On the other hand, a used amount that is outside of the range causes an increase in water-soluble content or a decrease in water absorption capacity due to a decrease in gel strength and thus is not preferable.

As a method for using the internal crosslinking agent, a method in which the internal crosslinking agent is added in advance in preparation of the monomer aqueous solution and a crosslinking reaction (crosslinking polymerization) is caused simultaneously with a polymerization reaction, is preferably adopted. However, the method for using the internal crosslinking agent is not limited to this method, and a method in which a polymerization reaction is initiated without adding the internal crosslinking agent to the monomer aqueous solution, and the internal crosslinking agent is added to cause crosslinking during the polymerization reaction or after end of the polymerization reaction, may be adopted. In addition, these methods may be used in combination.

(Others Materials to be Added to Monomer Aqueous Solution)

From the viewpoint of improvement in the physical properties of the obtained water-absorbing agent, the following materials can be added at one or more times among a time in preparation of the aforementioned monomer aqueous solution, a time during crosslinking polymerization, and a time after crosslinking polymerization. Examples of the materials include: hydrophilic polymers such, as starch, starch derivatives, cellulose, cellulose derivatives, polyvinyl alcohol, polyacrylic acid (salt), polyacrylic acid (salt) crosslinked products, and the like; foaming agents such as carbonates, azo compounds, bubbles, and the like; and compounds such as surfactants, chelating agents, chain transfer agents, and the like.

The addition amount of the hydrophilic polymer with respect to the monomer aqueous solution is preferably not greater than 50% by mass, more preferably not greater than 20% by mass, further preferably not greater than 10% by mass, and particularly preferably not greater than 5% by mass (the lower limit is 0% by mass). The addition amount of the compound with respect to the monomer aqueous solution is preferably not greater than 5% by mass, more preferably not greater than 1% by mass, and further preferably not greater than 0.5% by mass (the lower limit is 0% by mass).

In the case of adding a water-soluble resin or a water-absorbent resin as the hydrophilic polymer, a graft polymer or a water-absorbent resin composition (for example, a starch-acrylic acid polymer, a PVA-acrylic acid polymer, etc.) is obtained as a reaction product. The graft polymer and the water-absorbent resin composition are also included in the scope of the present invention.

(Concentration of Monomer in Monomer Aqueous Solution)

In this step, the monomer aqueous solution is prepared by selecting various materials as the above respective materials in accordance with the purpose and dissolving the selected materials in water or a mixed solvent of water and a hydrophilic solvent in predetermined amounts that satisfy the above ranges. A monomer aqueous solution obtained by dissolving materials, such as the above monomer containing acrylic acid (salt) as a main component and the like, in water is preferable. From the viewpoint of the physical properties of the water-absorbing agent, the concentration of the monomer in the monomer aqueous solution is preferably 10% by mass to 80% by mass, more preferably 20% by mass to 75% by mass, and further preferably 30% by mass to 70% by mass.

The concentration of the monomer is calculated from the following (mathematical formula 1). In the following (mathematical formula 1), the mass of the monomer aqueous solution does not include the masses of a graft component, a water-absorbent resin, and a hydrophobic organic solvent in reverse phase suspension polymerization.

$$\text{Concentration of monomer (\% by mass)} = (\text{mass of monomer})/(\text{mass of monomer aqueous solution}) \times 100 \quad \text{(mathematical formula 1)}$$

[2-2] Polymerization Step

This step is a step of polymerizing the monomer aqueous solution obtained in the above monomer aqueous solution preparation step, to obtain a crosslinked hydrogel polymer (hereinafter, referred to as "hydrogel").

(Polymerization Initiator)

The monomer aqueous solution may contain a polymerization initiator. Examples of the polymerization initiator include pyrolytic polymerization initiators, photolytic polymerization initiators, and redox polymerization initiators in which these polymerization initiators and reducing agents that promote decomposition of these polymerization initiators are used in combination. For example, the polymerization initiators described in U.S. Pat. No. 7,265,190 are used. In consideration of the type of polymerization and the like, one or more polymerization initiators are selected from among these polymerization initiators. From the viewpoint of the handleability of the polymerization initiator and the physical properties of the water-absorbing agent, a peroxide or an azo compound is preferably selected, a peroxide is more preferably selected, and a persulfate is further preferably selected.

The used amount of the polymerization initiator with respect to the entire monomer is preferably 0.001% by mole to 1% by mole and more preferably 0.001% by mole to 0.5% by mole. In addition, in the case of using the above reducing agent, the used amount of the reducing agent with respect to the entire monomer is preferably 0.0001% by mole to 0.02% by mole. By setting the used amounts of the polymerization initiator and the reducing agent within these ranges, a water-absorbing agent having desired water absorption performance is obtained.

The polymerization reaction may be initiated by application of active energy rays such as radiation, electron rays, ultraviolet rays, and the like instead of the polymerization initiator. In addition, the active energy rays may be used in combination with the polymerization initiator.

(Type of Polymerization)

Examples of the type of polymerization in the polymerization step include aqueous solution polymerization, reverse phase suspension polymerization, spray polymerization, bulk polymerization, precipitation polymerization, and the like. From the viewpoint of controllability of polymerization, the water absorption performance and the productivity of the water-absorbing agent, and the like, aqueous solution polymerization or reverse phase suspension polymerization is preferable.

As the aqueous solution polymerization, continuous aqueous solution polymerization is more preferably selected. Specific examples of continuous aqueous solution polymerization include continuous belt polymerization described in U.S. Pat. No. 4,893,999, etc., and continuous kneader polymerization described in U.S. Pat. No. 8,987,151, etc. The water-absorbing agent can be produced with high productivity by these continuous aqueous solution polymerizations.

Examples of preferable types of the above continuous aqueous solution polymerization include "high-temperature-initiation polymerization", "high-concentration polymerization", "foaming polymerization", and the like. These types of Polymerization can be individually carried out, or two or more thereof can be used in combination. The term "high-temperature-initiation polymerization" refers to a type of polymerization in which the temperature of the monomer aqueous solution at the time of initiation of polymerization is set to be preferably not lower than 30° C., more preferably not lower than 35° C., further preferably not lower than 40° C., and particularly preferably not lower than 50° C. (the upper limit is the boiling point of the monomer aqueous solution). The term "high-concentration polymerization" refers to a type of polymerization in which the concentration of the monomer in the monomer aqueous solution at the time of initiation of polymerization is preferably not less than 30% by mass, more preferably not less than 35% by mass, further preferably not less than 40% by mass, and particularly preferably not less than 45% by mass (the upper limit is the saturation concentration). The term "foaming polymerization" refers to a type in which bubbles (particularly, an inert gas described below) are dispersed in the monomer aqueous solution and polymerization is carried out.

Reverse phase suspension polymerization is a polymerization method in which polymerization is carried out in a state where the monomer aqueous solution is suspended in droplets having a particle diameter of 0.01 mm to 1 mm in a hydrophobic organic solvent, and a batch type and a continuous type are included. Reverse phase suspension polymerization has an advantage in that a particulate crosslinked hydrogel polymer (hereinafter, sometimes referred to as particulate hydrogel) having a product particle diameter is obtained simultaneously with polymerization. The reverse phase suspension polymerization described in U.S. Pat. No. 4,093,776, etc., can be used in the present invention.

Each of the above types of polymerization can be carried out in the air atmosphere. However, from the viewpoint of preventing coloring of the obtained water-absorbing agent, the polymerization step is preferably performed in an inert gas atmosphere such as nitrogen, argon, and the like (for example, the oxygen concentration is not greater than 1% by volume). More preferably, oxygen dissolved in the monomer aqueous solution is also sufficiently substituted with inert gas (for example, the amount of dissolved oxygen is made leas than 1 mg/L) in advance.

(Polymerization Ratio)

From the viewpoint of inhibition of aggregation of the particulate crosslinked hydrogel polymer in the drying step and the physical properties of the obtained water-absorbing agent, the polymerization ratio of the hydrogel obtained in this step is preferably not less than 70% by mass, preferably not less than 80% by mass, 90% by mass, 95% by mass, 98% by mass, and 99% by mass in this order, and most preferably not less than 99.5% by mass (the upper limit is 100% by mass). By setting the polymerization ratio of the hydrogel within the above range, aggregation and/or agglomeration of the particulate hydrogel in the drying step can be inhibited. The polymerization time in this step can be adjusted with the polymerization ratio of the hydrogel as an index.

[2-3] Gel Pulverization Step

This step is a step of performing gel pulverization on the crosslinked hydrogel polymer obtained in the polymerization step, to obtain a particulate crosslinked hydrogel polymer. The term "gel pulverization" means to make the crosslinked hydrogel polymer into particle form using a gel pulverizer such as a kneader, a meat chopper, a cutter mill, and the like. Regarding embodiments, conditions, and the like of gel pulverization, for example, the contents described in WO2011/126079, etc., can be used in the present invention.

In the case where kneader polymerization is selected as the type of polymerization, gel pulverization is performed in the polymerization step. In the case where reverse phase suspension polymerization is selected as the type of polymerization, a particulate crosslinked hydrogel polymer is generated in the process of polymerization. Thus, after the polymerization step by kneader polymerization or reverse phase suspension polymerization, the gel pulverization step is not performed in some cases. In such a case, the crosslinked hydrogel polymer obtained by kneader polymerization or reverse phase suspension polymerization is subjected to a later-described drying step, as a particulate crosslinked hydrogel polymer.

Therefore, regardless of the type of polymerization in the polymerization step, a crosslinked hydrogel polymer to be supplied in the drying step is referred to as "particulate crosslinked hydrogel polymer" or "particulate hydrogel" in the present invention.

(Shape of Particulate Hydrogel)

The shape of the particulate crosslinked hydrogel polymer to be supplied in the drying step is not limited. For example, the particulate hydrogel obtained through a series of steps including the gel pulverization step and the particulate hydrogel obtained by kneader polymerization have fracture surfaces formed by gel pulverization. Meanwhile, the particulate hydrogel obtained by reverse phase suspension polymerization has a spherical shape or is an aggregate (granulated substance) thereof.

(Gel Solid Content)

From the viewpoint of drying cost, the gel solid content of the particulate crosslinked hydrogel polymer to be supplied in the drying step is preferably not less than 10% by mass, more preferably not less than 20% by mass, further preferably not less than 30% by mass, and particularly preferably not less than 35% by mass. In addition, from the viewpoint of gel dispersibility, the gel solid content is preferably not greater than 70% by mass, more preferably not greater than 60% by mass, further preferably not greater than 50% by mass, and particularly preferably not greater than 60% by mass. By supplying the particulate crosslinked hydrogel polymer, in which the gel solid content is within the above range, to the later-described drying step, the advantageous effects of the present invention become remarkable. The term "gel solid content" means a value calculated from a drying loss (a mass change when 2.0 g of a sample is dried at 180° C. for 24 hours).

(Gel Ext)

The gel Ext of the particulate crosslinked hydrogel polymer (the water-soluble content of the hydrogel) to be supplied in the drying step, with respect to the gel solid content, is preferably not greater than 20% by mass, more preferably not greater than 15% by mass, and further preferably not greater than 10% by mass. By supplying the particulate hydrogel, in which the gel Ext is within the above range, to the later-described drying step, aggregation and/or agglomeration is inhibited, and the advantageous effects of the present invention become remarkable. The gel Ext is measured according to the method for measuring the Ext of the water-absorbent resin.

(Gel Particle Diameter)

From the viewpoint of drying efficiency, the particle diameter of the particulate crosslinked hydrogel polymer to be supplied in the drying step (hereinafter, referred to as "gel particle diameter") is preferably not greater than 2000 μm, more preferably not greater than 1800 μm, and further preferably not greater than 1500 μm. In addition, from the viewpoint of the physical properties of the obtained water-absorbing agent, the gel particle diameter is preferably not less than 25 μm, more preferably not less than 50 μm, and further preferably not less than 75 μm. When the gel particle diameter is within the above range, the gel dispersibility of the particulate hydrogel containing a drying aid is improved, and the particulate hydrogel easily flows by stirring or the like. As a result, the drying efficiency improves, and thus the gel particle diameter within the above range is preferable.

The gel particle diameter means the particle diameter of the particulate hydrogel immediately before the drying step starts. Thus, the gel particle diameter is measured before drying. In the case where the gel pulverization step is present, the gel particle diameter is measured after the gel pulverization step and before the drying step. In addition, in the case where the particulate hydrogel is an aggregate of a plurality of particles, the gel particle diameter of each particle (hereinafter, referred to as primary particle) that forms the aggregate is measured.

The gel particle diameter is measured as follows. An image of the particulate hydrogel is taken with an optical microscope (KH-3000, manufactured by Hirox Co., Ltd.). From the taken image, any n primary particles are selected, and the short diameters and the long diameters of the primary particles are measured. The average of these diameters is obtained according to the following calculation formula. The average is used as the gel particle diameter of the particulate hydrogel. "n" is an optional natural number, and may be selected as appropriate. Preferably, "n" is 10 to 1000.

$$\text{Gel particle diameter (μm)} = \Sigma[(\text{long diameter (μm)} + \text{short diameter (μm)})/2]/n$$

(Gel Temperature)

The temperature of the particulate crosslinked hydrogel polymer to be supplied in the drying step (hereinafter, referred to as "gel temperature") is preferably not lower than 30° C., preferably not lower than 40° C. and 50° C. in this order, and most preferably not lower than 55° C., In addition, the gel temperature is preferably not higher than 120° C., preferably not higher than 100° C., 90° C., and 80° C. in this order, and most preferably not higher than 70° C. By setting the gel temperature within the above temperature range, the mixability of the drying aid and the gel dispersibility and fluidity of the particulate hydrogel improve, and thus stirring drying of the present invention is more efficiently performed. The gel temperature is measured by bringing a sensor portion of a contact temperature meter into contact with the particulate hydrogel immediately before the particulate hydrogel is supplied in the drying step. The gel temperature refers to a temperature at the time when the temperature becomes stable.

[2-4] Drying Step

This step is a step of drying the particulate crosslinked hydrogel polymer obtained through the above steps, to obtain a dried polymer having a desired solid content. The term "solid content" means a value calculated from a drying loss (a mass change when 1.0 g of a sample is dried at 180° C. for 3 hours).

In the present invention, the solid content of the dried polymer is preferably not less than 70% by mass, more preferably not less than 80% by mass, further preferably 85% by mass to 99% by mass, particularly preferably 90% by mass to 99% by mass, and most preferably 92% by mass to 99% by mass.

(Drying Aid)

The method for producing the water-absorbing agent according to the present invention includes a drying step of drying a particulate crosslinked hydrogel polymer containing a drying aid. The drying aid is (a) a compound having a betaine structure and having a long-chain alkyl group having 8 or more carbon atoms, one quaternary nitrogen, and one acid group within a molecule thereof and/or (b) a compound having a long-chain alkyl group having 8 or more carbon atoms, one tertiary nitrogen, and one or more acid groups within a molecule thereof. Each of the molecular weights of the compounds defined in the above (a) and (b) is preferably 100 to 800, more preferably 100 to 650, and further preferably 100 to 500. In the present invention, the particulate crosslinked hydrogel polymer containing the drying aid is referred to as "intermediate composition of a water-absorbent resins".

As a result of thorough research, the present inventors have found that the effect of improving the gel dispersibility by the drying aid is particularly superior. Thus, by drying the particulate hydrogel in the presence of the drying aid, aggregation and/or agglomeration of the particulate hydrogels during drying is inhibited such that the degree thereof is very low, and thus the drying efficiency greatly improves. In addition, a load during pulverization in a later-described pulverization step is reduced, generation of fine powder that is not a target is inhibited. Furthermore, the drying aid exhibits a superior gel dispersibility improving effect with a small addition amount. With the drying aid, the addition amount thereof can be reduced, and thus the physical properties (quality) of the obtained water-absorbing agent can be maintained at high level.

The drying aid that is the compound defined in the above (a) and/or (b) is preferably one or more compounds selected from the group consisting of compounds represented by the following general formulas (1) to (3).

[Chem.1]

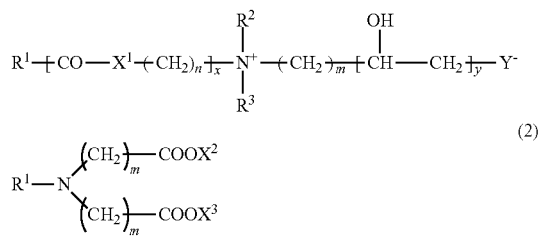

(1)

(2)

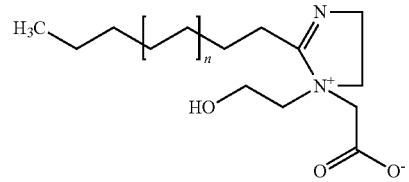

(3)

In formulas (1) and (2), $R^1$ is a saturated or unsaturated alkyl group having 8 to 20 carbon atoms or an alkyl group having a hydroxyl group and having 8 to 20 carbon atoms, and "m" is an integer not less than 1 and not greater than 6. In addition, in formula (1), $X^1$ is NH, $NR^4$ having an alkyl group $R^4$ having 1 to 4 carbon atoms, O, or S, "x" is 0 or 1, $R^2$ and $R^3$ are each independently an alkyl group having 1 to 4 carbon atoms or an alkyl group having a hydroxyl group at an end thereof and having 1 to 4 carbon atoms, "y" is 0 or 1, Y is COO, $SO_3$, $OPO(OR^5)O$, or $P(O)(OR^5)O$, and $R^5$ is a hydrogen atom or an alkyl group having 1 to 4 carbon atoms. Meanwhile, in formula (2), $X^2$ and $X^3$ are each independently a hydrogen atom, an alkali metal, or ammonium (excluding the case where $X^2$ and $X^3$ are each a hydrogen atom). Furthermore, in formula (1), "n" is an integer not less than 1 and not greater than 6. In formula (3), "n" only needs to be an integer not less than 1.

An example of the alkyl group as $R^1$ is a linear, branched, or alicyclic alkyl group having 8 to 20 carbon atoms. The alkyl group as $R^1$ may be saturated or may be unsaturated. Examples of this alkyl group include an n-octyl group, a sec-octyl group, a tert-octyl group, a 2-ethylhexyl group, a caprylic group, a nonyl group, a decyl group, an undecyl group, a lauryl group, a tridecyl group, a myristyl group, a pentadecyl group, a cetyl group, a heptadecyl group, a stearyl group, and the like. From the viewpoint of gel dispersibility, $R^1$ is preferably a linear alkyl group, and more preferably a linear saturated alkyl group.

In the case where $R^1$ is an alkyl group having a hydroxyl group and having 8 to 20 carbon atoms, examples of this alkyl group include a 2-hydroxydecyl group, a 2-hydroxyundecyl group, a 2-hydroxylauryl group, a 2-hydroxytridecyl group, a 2-hydroxymyristyl group, a 2-hydroxypentadecyl group, a 2-hydroxycetyl group, a 2-hydroxyheotadecyl group, a 2-hydroxystearyl group, and the like.

From the viewpoint of gel dispersibility, the number of carbon atoms of the alkyl group as $R^1$ is preferably not less than 8, more preferably not less than 10, and further preferably not less than 12. From the viewpoint of the physical properties of the water-absorbing agent, the number of carbon atoms of the alkyl group as $R^1$ is preferably not greater than 20, more preferably not greater than 19, and further preferably not greater than 18.

$R^2$ and $R^3$ are each independently an alkyl group having 1 to 4 carbon atoms or an alkyl group having a hydroxyl group at an end thereof and having 1 to 4 carbon atoms. Examples of the alkyl group include a methyl group, an ethyl group, an n-propyl group, an isopropyl group, an n-butyl group, an isobutyl group, a sec-butyl group, and a tert-butyl group. From the viewpoint of gel dispersibility, a methyl group or an ethyl group is preferable, and a methyl group is more preferable. $R^2$ and $R^3$ may be the same or may be different from each other.

$X^2$ and $X^3$ are each independently a hydrogen atom, an alkali metal, or ammonium (excluding the case where $X^2$ and $X^3$ are each a hydrogen atom). Examples of the alkali metal include sodium, potassium, and lithium. From the viewpoint of gel dispersibility, in the case where an alkali metal is selected as $X^2$ and/or $X^3$, sodium or potassium is preferable, and sodium is more preferable.

From the viewpoint of gel dispersibility, the integer "n" in formula (1) is preferably not less than 1 and not greater than 6, more preferably not less than 2 and not greater than 5, and further preferably 3. The integer "m" in formula (1) is preferably not less than 1 and not greater than 6, more preferably not less than 1 and not greater than 4, further preferably not less than 1 and not greater than 2, and particularly preferably 1. The integer "m" in formula (2) is preferably not less than 1 and not greater than 6, more preferably not less than 1 and not greater than 4, further preferably not less than 1 and not greater than 2, and particularly preferably 1. The two integers in formula (2) may be the same or may be different from each other. The integer "n" in formula (3) only needs to be not less than 1 and is not particularly limited.

The compounds (drying aids) represented by the above general formulas (1) to (3) are commercially available as surfactants. The compounds represented by the above general formulas (1) and (3) are classified into amphoteric surfactants, and are commercially available as betaine type amphoteric surfactants. The term "betaine" is a generic term for compounds having a betaine structure. The term "betaine structure" means a structure in which a positive charge and a negative charge are located at positions not adjacent to each other within the same molecule, a hydrogen atom which can be dissociated is not bound to an atom having the positive charge, and the molecule is uncharged as a whole.

An example of a common name for the compound in the case where $R^1$ is an alkyl group, "x" and "y" are each 0, and "m" is 1 in the above formula (1) is an alkyl dimethylamino acetic acid betaine (the chemical formula thereof is $R^1$—$N^+$($CH_3$)$_2$—$CH_2COO^-$). Specific examples of the alkyl dimethylamino acetic acid betaine include caprylic dimethylamino acetic acid betaine, lauryl dimethylamino acetic acid betaine, myristyl dimethylamino acetic acid betaine, stearyl dimethylamino acetic acid betaine, and the like. From the viewpoint of gel dispersibility and the physical properties of the water-absorbing agent, caprylic dimethylamino acetic acid betaine, lauryl dimethylamino acetic acid betaine, or stearyl dimethylamino acetic acid betaine is preferable, and lauryl dimethylamino acetic acid betaine is more preferable.

Caprylic dimethylamino acetic acid betaine is commercially available as "AMOGEN (registered trademark) HB-C" manufactured by DKS Co. Ltd,, etc. Lauryl dimethylamino acetic acid betaine is commercially available as "AMPHITOL (registered trademark) 20BS" and "AMPHITOL (registered trademark) 24B" manufactured by Kao Corporation, "NISSANANON (registered trademark) BL" and "NISSANANON (registered trademark) BL-SF" manufactured by NOF Corporation, "Obazoline (registered trademark) LB" and "Obazoline (registered trademark) LB-SF" manufactured by TOHO Chemical Industry Co., Ltd., "RIKABION (registered trademark) A-100" manufactured by New Japan Chemical Co., Ltd., "AMOGEN (registered trademark) K" and "AMOGEN (registered trademark) S-H" manufactured by DKS Co. Ltd., etc. The above stearyl dimethylamino acetic acid betaine is commercially available as "AMPHITOL (registered trademark) 86B" manufactured by Kao Corporation, etc.

An example of a common name for the compound in the case where $X^1$ is NH, "x" is 1, "y" is 0, a "n" is 3, and "m" is 1 in the above formula (1) is an alkylamide propyl betaine (the chemical formula thereof is $R^1$—CO—NH($CH_2$)$_3$—$N^+$($CH_3$)$_2$—$CH_2COO^-$). Specific examples of the alkylamide propyl betaine include lauric acid amide propyl betaine, coconut oil fatty acid amide propyl betaine, palm kernel oil fatty acid amide propyl betaine, and the like. From the viewpoint of gel dispersibility and the physical properties of the water-absorbing agent, lauric acid amide propyl betaine or coconut oil fatty acid amide propyl betaine is preferable, and lauric acid amide propyl betaine is more preferable.

Lauric acid amide propyl betaine is commercially available as "AMPHITOL (registered trademark) 20AB" manufactured by Kao Corporation, "RIKABION (registered trademark) B-300" manufactured by New Japan Chemical Co., Ltd., "AMOGEN (registered trademark) LB-C" manufactured by DKS Co. Ltd "NISSANANON (registered trademark) BDL-SF" manufactured by NOF Corporation, etc. In addition, the above coconut oil fatty acid amide propyl betaine is commercially available as "AMPHITOL (registered trademark) 55AB" manufactured by Kao Corporation, "Obazoline (registered trademark) CAB30" manufactured by TOHO Chemical Industry Co., Ltd,, "RIKABION (registered trademark) B-200" manufactured by New Japan Chemical Co,, Ltd,, "AMOGEN (registered trademark) CB-H" manufactured by DKS Co. Ltd., etc.

An example of a common name for the compound in the case where "x" is 0, "y" is 1, and "m" is 1 in the above formula (1) is an alkyl hydroxy sulfobetaine (the chemical formula thereof is $R^1$—$N^+$($CH_3$)$_2$—$CH_2CH(OH)CH_2SO_3^-$) Specific examples of the alkyl hydroxy sulfobetaine include lauryl hydroxy sulfobetaine and the like. From the viewpoint of gel dispersibility and the physical properties of the water-absorbing agent, lauryl hydroxy sulfobetaine is preferable. The above lauryl hydroxy sulfobetaine is commercially available as "AMPHITOL (registered trademark) 20HD" manufactured by Kao Corporation, etc.

An example of a common name for the compound corresponding to the above formula (2) is an alkyl amino monoalkali metal diacetate. Specific examples of the alkyl amino monoalkali metal diacetate include lauryl amino monosodium diacetate, lauryl amino potassium diacetate, myristyl amino sodium diacetate, and the like. From the viewpoint of gel dispersibility and the physical properties of the water-absorbing agent, lauryl amino monosodium diacetate is preferable. The above lauryl amino monosodium diacetate is commercially available as "NISSANANON (registered trademark) LA" manufactured by NOF Corporation, etc.

An example of a common name for the compound corresponding to the above formula (3) is an alkyl carboxymethyl hydroxyethyl imidazolinium betaine. Specific examples of the alkyl carboxymethyl hydroxyethyl imidazolinium betaine include 2-alkyl-N-carboxymethyl-N-hydroxyethyl imidazolinium betaine. From the viewpoint of gel dispersibility and the physical properties of the water-absorbinc agent, 2-alkyl-N-carboxymethyl-N-hydroxyethyl imidazolinium betaine is preferable. The above 2-alkyl-N-carboxymethyl-N-hydroxyethyl imidazolinium betaine is commercially available as "AMPHITOL (registered trademark) 20YB" manufactured by Kao Corporation, "NISSANANON (registered trademark) GLM-R-LV" manufactured by NOF Corporation, "Obazoline (registered trademark) 552" manufactured by TOHO Chemical Industry Co., Ltd., etc.

As described above, the drying aid used in the present invention is (a) a compound having a betaine structure and having a long-chain alkyl group having 8 or more carbon atoms, one quaternary nitrogen, and, one acid group within a molecule thereof and/or (b) a compound having a long chain alkyl group having 8 or more carbon atoms, one tertiary nitrogen, and one or more acid groups within a molecule thereof. The drying aid, with a small addition amount, specifically improves drying efficiency, also improves the physical properties of the water-absorbing agent after surface-crosslinking, and further can reduce a load in the pulverization step after drying. As the mechanism for this, aggregation and/or agglomeration of the particulate crosslinked hydrogel polymers is inferred to be inhibited by the carboxyl groups (—COOH, —COONa) of the water-absorbent resin and the nitrogen atoms of the drying aid being ionically bound to each other (—COO$^-$N$^+$—) such that the drying aid having a long-chain alkyl group and having 8 or more carbon atoms is efficiently fixed to the surface of the particulate crosslinked hydrogel polymer.

In the present invention, as the drying aid, a single compound may be used. In addition, a plurality of compounds that belong to the above formulas (1) to (3) may be used in combination.

The addition amount of the drying aid (that is, the amount of the drying aid contained in the intermediate composition) with respect to the gel solid content of the particulate crosslinked hydrogel polymer is preferably 0.001% by mass to 0.5% by mass, more preferably 0.010% by mass to 0.3% by mass, further preferably 0.020% by mass to 0.2% by mass, and particularly preferably 0.025% by mass to 0.2% by mass. In the case where a plurality of compounds are used in combination as the drying aid, the total amount of the compounds only needs to be within the above range. With a small addition amount of not greater than 0.5% by mass, the drying aid effectively inhibits aggregation and/or agglomeration of the particulate hydrogel during drying and exhibits high gel dispersibility. As a result, the drying efficiency improves. In addition, when the particulate hydrogel containing the drying aid in an addition amount within the above range (that is, the intermediate composition) is dried, the effect of the drying aid on the physical properties of the finally-obtained water-absorbing agent is small. The water-absorbing agent has high water absorption capacity under no load and high water absorption capacity under load and exhibits favorable appearance (color tone).

Preferably, the drying aid is added as a solution or a dispersion. From the viewpoint of uniform mixing, the drying aid is more preferably added as a solution (hereinafter, referred to as "drying aid solution"). The solution concentration of the drying aid is adjusted as appropriate in accordance with the type of the drying aid. In the case where the drying aid is commercially available as a solution the concentration of which is known, the solution may be used without changing the concentration, and, preferably, a solution obtained by adjusting the solution concentration within a desired range as appropriate by dilution or the like may be used. A solvent or a diluent for the drying aid solution is selected as appropriate in accordance with the type of the drying aid, water or a hydrophilic organic solvent is preferable, and water is more preferable.

In the drying step, the drying aid is added at a time when aggregation and/or agglomeration of the particulate crosslinked hydrogel polymer can be inhibited. For example, the drying aid may be added to the monomer aqueous solution before the monomer aqueous solution is subjected to the polymerization step, may be added to the particulate hydrogel after the polymerization step and before the drying step, or may be added during the drying step. In addition, in the case where the gel pulverization step is performed after the polymerization step, the drying aid may be added to the hydrogel before the gel pulverization step, or may be added to the particulate hydrogel after the gel pulverization step. Moreover, the drying aid may be added to the monomer aqueous solution or the hydrogel at a plurality of different times. Preferably, the drying aid is added during the gel pulverization step or after the gel pulverization step. When the drying aid is added at the above time, the drying aid is localized near the surface of the particulate hydrogel, and the gel dispersibility during drying improves.

As described above, in the case where kneader polymerization is selected as the type of polymerization, the gel pulverization is performed in the polymerization step. On the other hand, in the case where the type of polymerization is not kneader polymerization, the polymerization step and the gel pulverization step are separate steps, and the gel pulverization step is performed after the polymerization step. The specific surface area of the particulate hydrogel obtained in the gel pulverization step performed after the polymerization step is larger than the specific surface area of the particulate hydrogel obtained by the gel pulverization performed in the polymerization step. In the particulate hydrogel having a large specific surface area, the added, drying aid is localized near the surface of the hydrogel. Since the drying aid, is localized near the surface of the particulate hydrogel, the gel dispersibility during drying improves. From the viewpoint of improvement in gel dispersibility, the drying aid is preferably added to the particulate hydrogel after the gel pulverization step, and the gel pulverization step is preferably performed after the polymerization step. More preferably, the gel pulverization step is performed as a step separate from the polymerization step. In addition, in the case where the type of polymerization is reverse phase suspension polymerization, a particulate hydrogel having a large specific surface area is obtained after the polymerization step. Therefore, by adding the drying aid to the particulate hydrogel obtained by reverse phase suspension polymerization and drying the hydrogel, the advantageous effects of the present invention are achieved.

(Drying Temperature and Drying Time)

From the viewpoint of a drying rate, the drying temperature in the drying step of the present invention is preferably not lower than 100° C., more preferably not lower than 120° C., further preferably not lower than 140° C., and particularly preferably not lower than 160° C. In addition, from the viewpoint of deterioration and coloring of the dried polymer and the performance of the water-absorbing agent, the drying temperature is preferably not higher than 250° C., more preferably not higher than 230° C., and further preferably not higher than 200° C. The drying temperature is normally defined by the temperature of a heat medium. For example, in the case of hot air drying, the drying temperature is defined by the temperature of hot air. However, in the case of microwave drying or the like in which the drying temperature cannot be defined by the temperature of a heat medium, the drying temperature is defined by the temperature of the particulate hydrogel. In addition, the drying temperature may be a constant temperature throughout the drying step, or may be changed as appropriate during drying.

The drying time in the drying step of the present invention is preferably 10 minutes to 120 minutes, more preferably 20 minutes to 90 minutes, and further preferably 20 minutes to 60 minutes. By performing drying in the presence of the drying aid, the drying time can be shortened without excessively increasing the drying temperature. Thus, a water-absorbing agent that is less deteriorated by heating and has high physical properties is obtained.

(Drying Form)

Examples of the method for drying the particulate cross-linked hydrogel polymer include known methods such as conductive heat transfer drying, convection heat transfer drying (hot air drying), radiant heat transfer drying, drying under reduced pressure, drying through azeotropic dehydration with a hydrophobic organic solvent, superheated steam drying using high-temperature steam, and the like.

When the drying form is categorized by focusing on behavior of an object to be dried (particulate hydrogel) during drying, examples of the drying form include material stirring type drying, material ventilation type drying, material transfer type drying, hot air transfer type drying, and the like. Among them, material stirring type drying is most suitable for inhibiting adhesion of the particulate hydrogel to a drying device and aggregation and/or agglomeration of the particulate hydrogels during drying, and improving the drying efficiency. Therefore, material stirring type drying (hereinafter, referred to as "stirring drying") is adopted as the drying form of the present invention.

In the stirring drying of the present invention, adjacent particles are sequentially changed, and thus a certain particle newly comes into contact with one particle after another. Accordingly, the particulate hydrogel is uniformly mixed with the drying aid and heated through direct heat transfer and/or indirect heat transfer. The drying aid effectively inhibits aggregation and/or agglomeration of particles due to their new contact occurring sequentially, and acts so as to further enhance the effect of drying by stirring. Thus, the drying efficiency improves.

(Drying Device)

The drying device used in the present invention is a stirring type drying device capable of performing the above stirring drying, and only needs to have a form in which an object to be dried in the drying device is caused to flow by stirring means such as a stirring blade, a rotating cylinder, and the like. Examples of the stirring type drying device include a single-shaft or twin-shaft disc-type dryer, a single-shaft or twin-shaft paddle-type dryer, a rotary dryer, a rotary kiln, a tube dryer, and the like. Specifically, stirring type drying devices, such as Solidaire (manufactured by HOSOKAWA MICRON CORPORATION), a CD dryer (manufactured by Kurimoto, Ltd.), a paddle dryer (manufactured by NARA MACHINERY CO., LTD.), a steam tuber dryer (manufactured by Tsukishima Kikai Co., Ltd,), a rotary kiln (manufactured by Kurimoto, Ltd.), a rotary dryer (manufactured by OKAWARA MFG. CO., LTD.), and the like, can be used.

In the single-shaft or twin-shaft paddle-type dryer, which is one of the stirring type drying devices, particles are stirred by rotation of a stirring board, and thus the particles are replaced with each other and also often come into contact with a heat transfer surface, so that the particles can be efficiently dried. In addition, in the rotary kiln or the rotary dryer, which is another stirring type drying device, the particulate hydrogel is placed within a cylinder. When the cylinder rotates, the particulate hydrogel is moved within the cylinder, adjacent particles are replaced with each other, so that the particulate hydrogel is efficiently dried. That is, the particles that are revolved by rotation of the cylinder move to a high position, and then fall due to gravity. As a result, adjacent particles are replaced with each other.

The number of the stirring type drying devices that can be used in the drying step may be one or may be two or more. A plurality of stirring type drying devices having different specifications or forms may be used in combination. Moreover, the stirring type drying device and another drying device that is not classified into stirring type drying devices may be used in combination. Among a plurality of drying devices, at least one drying device is preferably the above stirring type drying device, and the types and the number of drying devices combined with this stirring type drying device are not limited.

In the case of using a plurality of drying devices, timing of switching of each device can be determined with the solid content. of the object to he dried as an index. For example, when the solid content is used as an index, examples of the drying form include a form in which the object to be dried is dried by the drying device at the first stage until the solid content reaches about 70% by mass, and then the object to be dried is dried by the drying device at the second stage until the solid content reaches a desired solid content, a form in which the object to be dried is further dried by the drying device at the second stage until the solid content reaches about 85% by mass, and then the object to be dried is dried by the drying device at the third stage until the solid content reaches a desired solid content, and the like. In the case where the stirring type drying device and another drying device are combined, a form in which the stirring type drying device is used at a stage in which the solid content is low, is preferable.

In the case where the stirring type drying device is a mechanical stirring type dryer that stirs the object to be dried (particulate hydrogel) with a rotary shaft provided with a stirring blade such as an arm, a vane, a paddle, a cutting disc (CD), and the like, the rotation speed of the rotary shaft is set as appropriate depending on the device, and is normally 5 rpm to 1000 rpm. In the case of a cylinder type such as a rotary kiln, the rotation speed of the cylinder is set as appropriate on the basis of the type and the size of the device, and is normally 1 rpm to 50 rpm.

The stirring type drying device can have a function to bring the device interior into a normal pressure state or a reduced pressure state. In the case of bringing the device interior into a reduced pressure state, the degree of pressure reduction with respect to the atmospheric pressure is preferably greater than 0 kPa and not greater than 5 kPa, more preferably 0.1 kPa to 2 kPa, and further preferably 0.1 kPa to 0.5 kPa. By setting the degree of pressure reduction within the above range, the particulate hydrogel can be efficiently dried, and aggregation and agglomeration of the particulate hydrogel in the drying step can be reduced. The term "degree of pressure reduction with respect to the atmospheric pressure" means a differential pressure with respect to the atmospheric pressure, and an air pressure lower than the atmospheric pressure is represented as a positive (plus) value. For example, when the atmospheric pressure is the standard atmospheric pressure (101.3 kPa) and the degree of pressure reduction with respect to the atmospheric pressure is 10 kPa, the air pressure within the device is 91.3 kPa.

The stirring type drying device can also have a function to introduce a carrier gas into the device. Examples of the carrier gas include air (dry air is included), nitrogen, steam, mixed gases thereof, and the like. From the viewpoint of handleability, dry air, nitrogen, steam, and mixed gases thereof are preferably used. The amount of the carrier gas to be introduced is arbitrarily set on the basis of the amount of moisture evaporated per unit time and the properties (dew point, amount of volatile components, etc.) of desired exhaust gas.

As the carrier gas, a high-temperature humid mixed gas (hereinafter, referred to as "high-humidity mixed gas") can be also used. In the present application, the high-humidity mixed gas means a mixed gas containing steam. Preferably, the high-humidity mixed gas is used by being introduced into the stirring type drying device and circulated therein. The temperature of the high-humidity mixed gas is preferably not lower than 105° C., more preferably not lower than 120° C., and further preferably not lower than 140° C. Regarding the upper limit, the temperature of the high-humidity mixed gas is preferably not higher than 250° C. and more preferably not higher than 200° C. The dew point of the high-humidity mixed gas is preferably not lower than 60° C., more preferably not lower than 70° C., further preferably not lower than 80° C., and particularly preferably not lower than 90° C.

Conventionally, in order to inhibit physical property deterioration and coloring of a water-absorbing agent due to oxygen, it is necessary to dry the particulate hydrogel in an inert gas atmosphere such as nitrogen, argon, and the like, which causes an increase in cost. By introducing the high-humidity mixed gas into the stirring type drying device, the interior of the drying device can be brought into a low oxygen state even when the used amount of the inert gas is reduced or the inert gas is not used. As a result, improvement in the physical properties and inhibition of coloring of the water-absorbing agent are achieved. In addition, an increase in cost due to use of the inert gas is avoided. Furthermore, the introduction of the high-humidity mixed gas contributes to inhibition of aggregation and/or agglomeration of the particulate hydrogel during drying, and thus is preferable.

The term "low oxygen state" means a state where the concentration of oxygen in the stirring type drying device is low, and particularly means a state where the concentration of oxygen in the atmosphere in a drying chamber in which the particulate hydrogel is housed is low. The concentration of oxygen is preferably not greater than 15% by volume, more preferably not greater than 10% by volume, further preferably not greater than 5% by volume, and particularly preferably not greater than 1% by volume. The lower limit is preferably 0% by volume, but may be about 0.1% by volume.

[2-5] Pulverization Step, Classification Step

This step is an optional step of pulverizing the dried polymer obtained in the drying step (a pulverization step) and adjusting the particle size thereof within a desired range (a classification step) to obtain water-absorbent resin powder. The pulverization step is different from the gel pulverization step in the above [2-3] in that the dried polymer, which is to be pulverized, has undergone the drying step. In the present invention, a specific drying aid is added to the particulate hydrogel and stirring drying is performed on the particulate hydrogel. Thus, the pulverization step and the classification step after drying become unnecessary in some cases. In addition, a load during pulverization is reduced, and thus generation of fine powder that is not a target can be effectively inhibited.

Examples of a device (pulverizer) used in the pulverization step include high-speed rotary type pulverizers such as a roll mill, a hammer mill, a screw mill, a pin mill, and the like, a vibration mill, a knuckle type pulverizer, a cylinder type mixer, and the like. From the viewpoint of ease of controlling a particle size distribution, a roll mill is preferably selected.

The particle size adjustment in the classification step is preferably performed through sieve classification with a JIS standard sieve (JIS Z8801-1 (2000)), air-flow classification, or the like. From the viewpoint of classification efficiency, sieve classification is preferably selected. More preferably, not only for the dried polymer after the drying step but also for a water-absorbing agent that is a final product, water-absorbing agent resin powder before a surface-crosslinking step, and water-absorbent resin particles after the surface-crosslinking step, this step (the pulverization step, the classification step) is performed such that a particle size distribution satisfies a preferable range described later. The particle size distribution can be adjusted as appropriate in the polymerization step (particularly, reverse phase suspension polymerization), a later-described granulation step, and a later-described fine powder removal step, in addition to this step (the pulverization step, the classification step).

[2-6] Surface-Crosslinking Step

This step is a step of carrying out a crosslinking reaction in a surface portion of the water-absorbent resin powder. The surface-crosslinking step is preferably a step of further providing a portion having a high crosslinking density to the surface portion of the water-absorbent resin powder (a portion several tens of micrometers from the surface of the water-absorbent resin powder to the inside). This step preferably includes a heat treatment step. This step more preferably includes a mixing step, a heat treatment step, and a cooling step. In the surface-crosslinking step, radical crosslinking, monomer polymerization, a crosslinking reaction with a surface-crosslinking agent, and the like are performed in the surface portion of the water-absorbent resin powder, whereby a surface-crosslinked water-absorbent resin (hereinafter, referred to as "water-absorbent resin particles") is obtained.

[2-6-1] Mixing Step

This step is a step of mixing the water-absorbent resin powder that has undergone the drying step, the pulverization step, and the classification step, and a surface-crosslinking agent within a mixing device to obtain a mixture.

(Moisture Content of Water-Absorbent Resin Powder)

From the viewpoint of mixability with a later-described surface-crosslinking agent, the moisture content of the water-absorbent resin powder to be subjected to the mixing step is preferably not greater than 20% by mass, more preferably 1% by mass to 15% by mass, further preferably 1% by mass to 10% by mass, and particularly preferably 1% by mass to 3% by mass. The moisture content of the water-absorbent resin powder is measured immediately before the water-absorbent resin powder is subjected to the mixing step in the surface-crosslinking step.

(Surface-Crosslinking Agent)

As the surface-crosslinking agent, for example, the surface-crosslinking agents described in U.S. Pat. No. 7,183,456, etc., are used. One or more surface-crosslinking agents are selected from among them in consideration of reactivity and the like. In addition, from the viewpoint of handleability of the surface-crosslinking agent and the water absorption performance of the water-absorbing agent, an organic compound having two or more functional groups that react with the carboxyl groups of the water-absorbent resin to form covalent bonds is preferably selected. Specific examples of such a compound include polyhydric alcohol compounds, epoxy compounds, polyvalent amine compounds, condensates of polyvalent amine compounds and halo-epoxy compounds, oxazoline compounds, oxazolidinone compounds, alkylene carbonate compounds, polyvalent glycidyl compounds, oxetane compounds, vinyl ether compounds, cyclic urea compounds, and the like.

The used amount of the surface-crosslinking agent with respect to 100 parts by mass of the water-absorbent resin powder is preferably 0.001 parts by mass to 10 parts by mass and more preferably 0.005 parts by mass to 5 parts by mass. By setting the used amount of the surface-crosslinking agent within this range, an optimum crosslinked structure is formed in the surface portion of the water-absorbent resin powder, and a water-absorbing agent having high physical properties is obtained. In the case where two or more surface-crosslinking agents are used, the total amount of the surface-crosslinking agents is preferably within the above range.

The surface-crosslinking agent is preferably added as an aqueous solution (hereinafter, referred to as "surface-crosslinking agent solution") to the water-absorbent resin powder. In this case, the used amount of water with respect to 100 parts by mass of the water-absorbent resin powder is preferably 0.1 parts by mass to 20 parts by mass, more preferably 0.3 parts by mass to 15 parts by mass, and further preferably 0.5 parts by mass to 10 parts by mass. By setting the used amount of water within the above range, the handleability of the surface-crosslinking agent solution is improved, and the surface-crosslinking agent can be uniformly mixed into the water-absorbent resin powder.

(Mixing Method)

Examples of a preferable method for mixing the water-absorbent resin powder and the surface-crosslinking agent solution include a method in which the surface-crosslinking agent solution is sprayed to the water-absorbent resin powder, and a method in which the surface-crosslinking agent solution is dripped to the water-absorbent resin powder. More preferably, the method in which spraying is performed in mixing is selected.

A mixing device for performing the mixing step preferably has great mixing force for uniformly and assuredly mixing the water-absorbent resin powder and the surface-crosslinking agent. The mixing device is preferably a high-speed stirring type mixer and more preferably a high-speed stirring type continuous mixer. Specifically, a cylindrical mixer, a double walled conical mixer, a V-shaped mixer, a ribbon mixer, a screw mixer, a flow furnace rotary disk type mixer, an airflow mixer, a double-arm kneader, an internal mixer, a pulverizing kneader, a rotary mixer, a screw extruder, a turbulizer, or the like is selected.

From the viewpoint of the mixability with the surface crosslinking agent solution, the aggregability of the mixture, and the like, the temperature of the water-absorbent resin powder to be supplied in the mixing step is preferably 35° C. to 80° C., more preferably 35° C. to 70° C., and further preferably 35° C. to 60° C. In addition, the mixing time is preferably 1 second to 1 hour and more preferably 5 seconds to 10 minutes.

[2-6-2] Heat Treatment Step

This step is a step of performing heat treatment on the mixture obtained in the mixing step, to obtain a surface-crosslinked water-absorbent resin (hereinafter, referred to as "water-absorbent resin particles").

(Heat Treatment Method)

Examples of a method for heating the mixture include a method in which the mixture is heated in a state where the mixture is left at rest, a method in which the mixture is heated while being mixed by stirring, and the like. From the viewpoint of uniformly heating the entire mixture, the method in which the mixture is heated while being mixed by stirring is preferable. Preferable examples of a device used in this step include a paddle dryer, a multi-fin processor, a towered dryer, and the like.

The heating temperature in this step only needs to be set in accordance with the type and the amount of the surface-crosslinking agent to be used, the water absorption performance of the target water-absorbing agent, and the like. The heating temperature, as the temperature of a heat medium, is preferably 150° C. to 250° C. and more preferably 180° C. to 210° C. In addition, the heating time is preferably 1 minute to 2 hours. Examples of a combination of the heating temperature and the heating time include 180° C. and 0.1 hour to 1.5 hours, 200° C. and 0.1 hour to 1 hour, and the like.

[2-6-3] Cooling Step

This step is an optional step provided as necessary after the heat treatment step. In this step, the water-absorbent resin particles are forcibly cooled, and thus the surface-crosslinking reaction that is proceeding in the surface portions of the water-absorbent resin particles is immediately ended.

(Cooling Method)

Examples of a method for cooling the water-absorbent resin particles include a method in which the water-absorbent resin particles are cooled in a state where the water-absorbent resin particles are left at rest, a method in which the water-absorbent resin particles are cooled while being mixed by stirring, and the like. From the viewpoint of uniformly and immediately cooling the entire water-absorbent resin particles, the method in which the water-absorbent resin particles are cooled while being mixed by stirring is preferable. Preferable examples of a device used in this step include a paddle dryer, a multi-fin processor, a towered dryer, and the like.

The cooling temperature in this step only needs to be set in accordance with the heat treatment temperature, the water absorption performance of the target water-absorbing agent, and the like. The cooling temperature, as the temperature of a cooling medium, is preferably 40° C. to 100° C., more preferably 40° C. to 90° C., and further preferably 40° C. to 70° C.

As described above, when the drying aid is present at the surface of the particulate hydrogel, the drying aid enhances the gel dispersibility in the drying step. However, the drying aid may change due to the surface treatment step. For example, the drying aid may decompose and react by heating in the heat treatment step. In addition, the drying aid may react with the surface-crosslinking agent. The drying aid that has changed due to the surface-crosslinking step can has an adverse effect on the physical properties of the water-absorbent resin. In the production method according to the present invention, since the specific drying aid that exhibits high gel dispersibility with a small amount is used, the addition amount thereof is reduced, and thus an adverse effect on the physical properties of the water-absorbent resin is inhibited. As a result, the physical properties of the water-absorbing agent obtained through the surface-crosslinking step improve.

[2-7] Addition Step

This step is an optional step that is performed for the purpose of providing various additional functions to the water-absorbing agent or improving water absorption performance. In this step, additives, such as a chelating agent, an organic reducing agent, an inorganic reducing agent, an oxidizer, a hydroxycarboxylic acid compound, a surfactant, a compound having a phosphorus atom, organic powder such as metallic soap and the like, a deodorant, an antibacterial agent, pulp or thermoplastic fibers, a polyvalent metal salt, a cationic polymer, inorganic fine particles, and the like, are added to the water-absorbent resin particles obtained in the surface-crosslinking step. From the viewpoint of the effect of the addition, the additives are preferably present at the surfaces of the water-absorbent resin particles. Therefore, the addition step is preferably performed simultaneously with the surface-crosslinking step or after the surface-crosslinking step. More preferably, the addition step is performed after the surface-crosslinking step.

[2-8] Other Steps

In addition to the above-described steps, steps such as a sizing step, a fine powder removal step, a granulation step, a fine powder recycling step, an iron removal step, and the like may be provided as necessary. Moreover, at least one step selected from steps such as a transport step, a storage step, a packing step, a keeping step, and the like can be further included.

The "sizing" step includes a fine powder removal step after the surface-crosslinking step, and a step of performing pulverization and classification when the water-absorbent resin aggregates to have a size larger than a desired size. In addition, the "fine powder recycling" step includes a form in which fine powder is added without being changed, or a form in which a large hydrogel is formed from fine powder and added to any step.

[3] Physical Properties of Water-Absorbing Agent

In the case where the water-absorbing agent obtained by the production method according to the present invention is used for application as an absorbent body for absorbent articles such as disposable diapers and the like, [3-1] CRC (Centrifuge Retention Capacity), [3-2] AAP (Water Absorption Capacity under Load), and [3-6] Color Tone (White Balance) among the physical properties described below are preferably controlled within desired ranges. In addition, while these physical properties are satisfied, at least one of, preferably two or more of, and more preferably all the physical properties of, [3-3] Ext (Water-Soluble Content), [3-4] Particle Size, and [3-5] Moisture Content, are controlled within desired ranges.

When these physical properties do not satisfy the ranges described below, sufficient performance may not be exerted in high-concentration disposable diapers. Unless otherwise specified, the physical properties described below are measured according to the EDANA methods.

[3-1] CRC (Centrifuge Retention Capacity)

The CRC (centrifuge retention capacity) of the water-absorbing agent of the present invention is normally not less than 5 g/g, preferably not less than 10 g/g, more preferably not less than 20 g/g, and further preferably not less than 25 g/g. In consideration of balance with the other physical properties, the CRC is preferably not greater than 60 g/g, more preferably not greater than 55 g/g, and further preferably not greater than 50 g/g.

Therefore, a preferable range of the CRC may be selected within the above range as appropriate. For example, 10 g/g to 50 g/g, 25 g/g to 60 g/g, 20 g/g to 55 g/g, and the like are preferable.

The water-absorbing agent having CRC within the above range has a large amount of absorption and has a high speed at which body fluids such as urine, blood, and the like are absorbed, and thus is suitable as an absorbent body for absorbent articles such as disposable diapers and the like. The CRC is controlled by changing the types or the amounts of the internal crosslinking agent, the surface-crosslinking agent, and the like.

[3-2] AAP (Water Absorption Capacity Under Load)

The AAP (water absorption capacity under load) of the water-absorbing agent of the present invention is preferably not less than 10 g/g, more preferably not less than 20 g/g, and further preferably not less than 30 g/g. In consideration of balance with the other physical properties, the AAP under 2.06 kPa is preferably not greater than 50 g/g, more preferably not greater than 45 g/g, and further preferably not greater than 40 g/g.

The water-absorbing agent having AAP within the above range has a small amount of liquid return (hereinafter, sometimes referred to as "Re-Wet") when pressure is applied to an absorbent article such as a disposable diaper and the like, and thus is suitable as an absorbent body for absorbent articles such as disposable diapers and the like. The AAP is controlled by the particle size of the water-absorbing agent, change of the surface crosslinking agent, and the like.

[3-3] Ext (Water-Soluble Content)

The Ext (water-soluble content) of the water-absorbing agent of the present invention is normally not greater than 50% by mass, preferably not greater than 35% by mass, more preferably not greater than 25% by mass, and further preferably not greater than 15% by mass. The lower limit of the Ext is not particularly limited, but the Ext is preferably not less than 0% by mass and more preferably not less than 0.1% by mass.

Therefore, a preferable range of the Ext may be selected within the above range as appropriate. For example, 0% by mass to 15% by mass, 0.1% by mass to 50% by mass, 0.1% by mass to 25% by mass, and the like are preferable.

The water-absorbing agent having Ext within the above range has high gel strength and excellent liquid permeability. Furthermore, since the Re-Wet is small, the water-absorbing agent is suitable as an absorbent body for absorbent articles such as disposable diapers and the like. The Ext is controlled, by the types or the amounts of the internal crosslinking agent and the like.

[3-4] Particle Size

The particle size (PSD (particle size distribution), and $\sigma\zeta$ (mass-average particle diameter), and (logarithmic standard deviation)) of the water-absorbing agent of the present invention is preferably in the following ranges.

Specifically, the proportion of particles having a particle diameter of less than 150 μm in the water-absorbing agent is preferably not greater than 10% by mass, more preferably not greater than 5% by mass, and further preferably not greater than 1% by mass. In addition, the proportion of particles having a particle diameter of not less than 850 μm in the water-absorbing agent is preferably not greater than 5% by mass, more preferably not greater than 3% by mass, and further preferably not greater than 1% by mass. Each of the lower limits of the proportions of these particles is preferably lower, and is desirably 0% by mass, but may be about 0.1% by mass. The PSD within the above range contributes to improvement in the physical properties of the water-absorbing agent.

D50 (mass-average particle diameter) of the water-absorbing agent of the present invention is preferably 200 μm to 600 μm, more preferably 200 μm to 550 μm, further preferably 250 μm to 500 μm, and particularly preferably 350 μm to 450 μm. Furthermore, the $\sigma\zeta$ (the logarithmic standard deviation of the particle size distribution) of the water-absorbing agent of the present invention is preferably 0.20 to 0.50, more preferably 0.25 to 0.40, and further preferably 0.27 to 0.35.

[3-5] Moisture Content

The moisture content of the water-absorbing agent of the present invention is preferably greater than 0% by mass and not greater than 15% by mass, more preferably 1% by mass to 13% by mass, further preferably 2% by mass to 10% by mass, and particularly preferably 2% by mass to 9% by mass.

The water-absorbing agent having a moisture content within the above range has excellent powder characteristics (e.g., fluidity, transportability, damage resistance, etc.). The moisture content is controlled by the drying step, the surface-crosslinking step, the addition step, and the like.

[3-6] Color Tone (White Balance)

The color tone (White Balance, hereinafter abbreviated as "WB") of the water-absorbing agent of the present invention is preferably not less than 69, more preferably not less than 71, and further preferably not less than 73. Regarding the upper limit, the color tone (WB) is not greater than 65.

Therefore, a preferable range of the color tone (WB) may be selected within the above range as appropriate. For example, 69 to 85, 71 to 85, 73 to 85, and the like are preferable.

When the water-absorbing agent having color tone (WB) within the above range is combined with white pulp, an absorbent article such as a disposable diaper and the like that does not give an uncomfortable feeling due to coloring is obtained. Thus, such a water-absorbing agent is preferable. In addition, the water-absorbing agent is generally white powder, but may be colored (in yellow to brown) when exposed to a high humidity environment. However, the water-absorbing agent obtained by the production method according to the present invention can reduce such coloring, and thus has excellent color tone (WB). The color tone (WB) is influenced by the particle shape of the water-absorbing agent and thus is controlled by pulverization, classification, and the like.

[4] Application of Water-Absorbing Agent

The water-absorbing agent of the present invention is preferably used for application as an absorbent body for absorbent articles such as disposable diapers, sanitary napkins, incontinence pads, and the like, packaging such as drip sheets for food and the like, water stopping materials for industrial use, water retention agents for agricultural and horticultural use, and the like.

In particular, the water-absorbing agent can be used as an absorbent body for high-concentration disposable diapers (in which the used amount per one disposable diaper is large) for which odor, coloring, and the like derived from the raw material have been problems. When the water-absorbing agent of the present invention is used in an upper layer of the absorbent body, significant effects can be expected.

As the absorbent body, an absorbent material such as pulp fibers and the like can also be used in addition to the water-absorbing agent. In this case, the amount (core concentration) of the water-absorbing agent contained in the absorbent body is preferably 30% by mass to 100% by mass, more preferably 40% by mass to 100% by mass, further preferably 50% by mass to 100% by mass, even more preferably 60% by mass to 100% by mass, particularly preferably 70% by mass to 100% by mass, and most preferably 75% by mass to 95% by mass.

In the case where the absorbent body having a core concentration within the above range is used in an upper layer of an absorbent article, the absorbent article is kept in a white state providing a clean feel. Furthermore, the absorbent article, is excellent in diffusion property with respect to body fluids such as urine, blood, and the like, and thus an increase in absorption amount can be expected due to efficient liquid distribution.

EXAMPLES

The following will describe the present invention more specifically by means of Examples and Comparative Examples. However, the present invention is not limited to the description thereof, and an Example obtained by appropriately combining technical means that are disclosed in the respective Examples is also included in the technical scope of the present invention.

Unless specifically noted otherwise, a power source of 200 V or 100 V was used for electric apparatuses (including an apparatus for measuring physical properties of a water-absorbent resin) used in Examples and Comparative Examples. In addition, unless specifically noted otherwise, various physical properties of a water-absorbing agent were measured under conditions of room temperature (20° C. to 25° C.) and a relative humidity of 50% RH ±10%. Furthermore, for the sake of convenience, "liter" is sometimes represented as "l" or "L", and "% by mass" is sometimes represented as "wt %".

[Measurements of Physical Properties of Water-Absorbing Agent and Crosslinked Hydrogel Polymer]

The following will describe methods for measuring the physical properties of a water-absorbing agent and a crosslinked hydrogel polymer. In the case where objects to be measured are a dried polymer, water-absorbent resin powder, and water-absorbent resin particles, the methods are used with the water-absorbing agent replaced with the respective objects to be measured.

(a) CRC (Centrifuge Retention Capacity)

The CRC (centrifuge retention capacity) of a water-absorbing agent was measured according to the EDANA method (ERT441.2-02). The same measurement was also performed for a dried polymer.

(b) AAP (Water Absorption Capacity Under Load)

The AAP (water absorption capacity under load) of a water-absorbing agent was measured according to the EDANA method (ERT442.2-02).

(c) Gel Ext (Water-Soluble Content of Hydrogel)

The gel Ext (water-soluble content of a crosslinked hydrogel polymer) was measured according to the EDANA method (ERT470.2-02). Measurement was taken with its sample amount changed to 2.0 g, and a measurement value was corrected by a gel solid content.

(d) Moisture Content

The moisture content of a water-absorbing agent was measured according to the EDANA method (ERT430.2-02). Measurement was taken with its sample amount changed to 1.0 g and its drying temperature changed to 180° C.

(e) Solid Content, Gel Solid Content

The solid content of a water-absorbing agent and the gel solid content of a crosslinked hydrogel polymer were each obtained by subtracting the "moisture content" defined by the EDANA method (ERT430.2-02) from 100 (unit: % by mass). Measurement of the water-absorbing agent was taken with its sample amount changed to 1.0 g and its drying temperature changed to 180° C. Measurement of the hydrogel was taken with its sample amount changed to 2.0 g, its drying temperature changed to 180° C., and its drying time changed to 24 hours. That is, a value obtained by the above (100-moisture content) was used as a solid content (unit: % by mass) for the water-absorbing agent, and as a gel solid content (unit: % by mass) for the hydrogel.

(f) Color Tone (WB)

The color tone (WB; White Balance) of a water-absorbing agent was measured according to the following procedure. First, a spectral color difference meter (SZ-Σ80, manufactured by NIPPON DENSHOKU INDUSTRIES CO., LTD.) was used as a measuring device. As a measurement condition, reflection measurement was selected. The spectral color difference meter is provided with a powder/paste sample container (inner diameter: 30 mm, height: 12 mm), a powder/paste sample standard round white plate No. 2, and a light-projection pipe of 30Φ (diameter: 30 mm). Next, 5 g of the water-absorbing agent was put into the powder/paste sample container, and then the color tone (WB) of the surface of the water-absorbing agent was measured under an atmosphere of room temperature (20° C. to 25° C.) and a relative humidity of 50%RH. The color tone (WB) of the water-absorbing agent was measured within one week after production of the water-absorbing agent.

(g) Polymerization Ratio of Hydrogel

The polymerization ratio of a crosslinked hydrogel polymer was measured according to the following procedure. First, 1.00 g of the hydrogel was put into 1000 g of deionized water, and the mixture was stirred at 300 rpm for 2 hours. Then, the mixture was filtrated to remove insoluble matter. The amount of the monomer extracted in the filtrate obtained by this operation was measured by using liquid chromatography. For the acquired data, a polymerization ratio C (unit: % by mass) was calculated by correction with a gel solid content according to the following (mathematical formula 3).

Polymerization ratio $C$ (% by mass)=$100 \times \{1-m/(\alpha \times M/100)\}$ (mathematical formula 3)

In (mathematical formula 3), m is the mass of the monomer (unit: g), M is the mass of the hydrogel (unit: g), and α is the gel solid content of the hydrogel (unit: % by mass).

Production Example 1

368 g of acrylic acid, 307 g of a 48.5% by mass sodium hydroxide aqueous solution, 303 g of deionized water, and 0.8 g of polyethylene glycol diacrylate as an internal cross-linking agent were put into a polypropylene container having a capacity of 1 L and an inner diameter of 80 mm and were mixed therein to prepare a monomer aqueous solution (1). The average addition mole number n of ethylene oxide of the polyethylene glycol diacrylate was 9, and the addition amount thereof with respect to acrylic acid was 0.03% by mole.

The neutralization ratio of the monomer aqueous solution (1) was 73% by mole, and the monomer concentration thereof was 45% by mass. In addition, the temperature of the monomer aqueous solution (1) was increased to 98° C. by heat of neutralization and heat of dissolution generated in the process of mixing.

Thereafter, stirring of the monomer aqueous solution (1) was continued, 20 g of a 3.0% by mass sodium persulfate aqueous solution was added as a polymerization initiator to the monomer aqueous solution (1) at the time when the temperature of the monomer aqueous solution (1) reached 95° C., and the mixture was stirred for about 5 seconds, to obtain a reaction solution (1).

Next, the reaction solution (1) was poured into a vat type stainless container in a system open to the atmosphere. The vat type stainless container had a bottom surface with a size of 250 mm×250 mm, an upper surface with a size of 640 mm×640 mm, a height of 50 mm, and a trapezoidal center cross-section, and had a silicon sheet attached to the inner surface thereof. In addition, the vat type stainless container had been placed and preheated on a hot plate (NEO HOT-PLATE H1-1000, manufactured by AS ONE Corporation) heated to 100° C.

After the reaction solution (1) was poured into the vat type stainless container, a polymerization reaction started. The polymerization reaction proceeded with expansion and foaming toward the upper side in all directions while steam was being generated. Thereafter, contraction occurred to a size slightly larger than the bottom surface of the vat type stainless container. The polymerization reaction (expansion, contraction) ended within about 1 minute, but thereafter, the resultant product was kept within the vat type stainless container for 3 minutes. By the polymerization reaction, a plate-shaped crosslinked hydrogel polymer (hereinafter, referred to as "hydrogel") (1) was obtained. The polymerization ratio of the hydrogel in Production Example 1 was 99% by mass.

Next, the plate-shaped hydrogel (1) was cut into a strip-shaped hydrogel (1), and then gel pulverization thereof was performed by a meat chopper (HL-3225N, manufactured by REMACOM CO., LTD) to obtain a particulate hydrogel (1). The meat chopper was provided with a multi-hole plate having 24 holes with a hole diameter of 9.5 mm. The gel particle diameter of the obtained particulate hydrogel (1) was 1300 μm. In addition, the gel solid content thereof was 50% by mass, and the gel Ext thereof was in by mass.

Example 1

The particulate hydrogel (1) obtained in Production Example (1) described above was dried as follows. As a drying device, a stirring type dryer having a capacity of 5 L (CD dryer, model: CD-80, manufactured by Kurimoto, Ltd.) was used. In the CD dryer, the temperatures of a rotary shaft of a stirring plate and a jacket were set to 180° C., and a rotation speed was set to 30 rpm.

First, a 3.1% by mass lauryl dimethylamino acetic acid betaine (AMPHITOL (registered trademark) 20BS, manufactured by Kao Corporation) aqueous solution was prepared as a drying aid solution. Subsequently, the particulate hydrogel (1) was continuously fed to the CD dryer using a uniaxial shaftless screw (Accurate Feeder, manufactured by KUMA engineering Co., LTD.) while the AMPHITOL 20BS aqueous solution was being added to the particulate hydrogel (1). The gel temperature of the particulate hydrogel (1) immediately before the drying aid solution was added was 55° C. The processed amount of the particulate hydrogel (1) was 4.5 kg/hr, and the addition amount of the AMPHITOL 20BS aqueous solution was 0.14 kg/hr. In addition, the amount of the lauryl dimethylamino acetic acid betaine with respect to the gel solid content of the hydrogel (1) was 0.20% by mass.

A particulate dried polymer (1) having a solid content of 90.3% by mass was obtained by the drying operations.

During the continuous drying, the dew point of the atmosphere within the CD dryer was 85° C., and the concentration of oxygen within the CD dryer was 9.0% by volume. The retained amount of the particulate hydrogel (1) within the CD dryer was 1.1 kg, and the average retention time thereof was 35 minutes.

Subsequently, the obtained particulate dried polymer (1) was pulverized using a roll mill and then classified using JIS standard sieves having opening sizes of 850 μm and 150 μm, respectively. By the pulverization and the classification, water-absorbent resin powder (1) having a particle diameter of not less than 150 μm and less than 850 μm was obtained. The moisture content of the obtained water-absorbent resin powder (1) was 1.7% by mass.

Next, a surface-crosslinking agent solution containing 0.025 parts by mass of ethylene glycol diglycidyl ether, 0.4 parts by mass of 1,4-butanediol, 0.6 parts by mass of propylene glycol, and 3.0 parts by mass of deionized water was added to 100 parts by mass of the water-absorbent resin powder (1), and the mixture was mixed such that the mixture was uniform. Thereafter, the mixture was heated at 190° C. for 30 minutes and then forcibly cooled to 60° C.

A water-absorbing agent (1) was obtained by the above series of operations. Various physical properties of the water-absorbing agent (1) are shown in Table 1.

Example 2

Water-absorbent resin powder (2) and a water-absorbing agent (2) were obtained by performing the same operations as in Example 1, except the 3.1% by mass AMPHITOL 20BS aqueous solution in Example 1 was changed to a 3.0% by mass lauric acid amide propyl betaine (AMPHITOL (registered trademark) 20AB, manufactured by Kao Corporation) aqueous solution. The moisture content of the obtained water-absorbent resin powder (2) was 2.0% by mass. In addition, various physical properties of the water-absorbing agent (2) are shown in Table 1.

Example 3

Water-absorbent resin powder (3) and a water-absorbing agent (3) were obtained by performing the same operations as in Example 1, except the 3.1% by mass AMPHITOL 20BS aqueous solution in Example 1 was changed to a 4.0% by mass 2-alkyl-N-carboxymethyl-N-hydroxyethyl imidazolinium betaine (AMPHITOL (registered trademark) 20YB, manufactured by Kao Corporation) aqueous solution, and the addition amount thereof was further changed to 0.08 kg/hr (0.15% by mass with respect to the gel solid content of the hydrogel (1)). The moisture content of the obtained water-absorbent resin powder (3) was 2.0% by mass. In addition, various physical properties of the water-absorbing agent (3) are shown in Table 1.

Example 4

Water-absorbent resin powder (4) and a water absorbing agent (4) were obtained by performing the same operations as in Example 1, except the 3.1% by mass AMPHITOL 20BS aqueous solution in Example 1 was changed to a 2.7% by mass stearyl dimethylamino acetic acid betaine (AMPHITOL (registered trademark) 86B, manufactured by Kao Corporation) aqueous solution, and the addition amount thereof was further changed to 0.02 kg/hr (0.02% by mass with respect to the gel solid content of the hydrogel (1)). The moisture content of the obtained water-absorbent resin powder (4) was 2.7% by mass. In addition, various physical properties of the water-absorbing agent (4) are shown in Table 1.

Example 5

Water-absorbent resin powder (5) and a water-absorbing agent (5) were obtained by performing the same operations as in Example 1, except the 3.1% by mass AMPHITOL 20BS aqueous solution in Example 1 was changed to a 3.0% by mass coconut oil fatty acid amide propyl betaine (AMPHITOL (registered trademark) 55AB, manufactured by Kao Corporation) aqueous solution, and the addition amount thereof was further changed to 0.03 kg/hr (0.04% by mass with respect to the gel solid content of the hydrogel (1)). The moisture content of the obtained water-absorbent resin powder (5) was 2.5% by mass. In addition, various physical properties of the water-absorbing agent (5) are shown in Table 1.

Example 6

Water-absorbent resin powder (6) and a water-absorbing agent (6) were obtained by performing the same operations as in Example 1, except the 3.1% by mass AMPHITOL 20BS aqueous solution in Example 1 was changed to a 3.0% by mass lauryl hydroxy sulfobetaine (AMPHITOL (registered trademark) 20HD, manufactured by Kao Corporation) aqueous solution, and the addition amount thereof was further changed to 0.03 kg/hr (0.04% by mass with respect to the gel solid content of the hydrogel (1)), The moisture content of the obtained water-absorbent resin powder (6) was 2.5% by mass. In addition, various physical properties of the water-absorbing agent (6) are shown in Table 1.

Example 7

Water-absorbent resin powder (7) and a water-absorbing agent (7) were obtained by performing the same operations as in Example 1, except the 3.1% by mass AMPHITOL 20BS aqueous solution in Example 1 was changed to a 2.8% by mass lauryl amino monosodium diacetate (NISSANANON (registered trademark) LA, manufactured by NOF Corporation) aqueous solution, and the addition amount thereof was further changed to 0.15 kg/hr (0.20% by mass with respect to the gel solid content of the hydrogel (1)). The moisture content of the obtained water-absorbent resin powder (7) was 2.0% by mass. In addition, various physical properties of the water-absorbing agent (7) are shown in Table 1.

Comparative Example 1

The same operations as in Example 1 were performed except the 3.1% by mass AMPHITOL 2055 aqueous solution in Example 1 was changed to a 10.0% by mass trimethyl glycine aqueous solution, and the addition amount thereof was further changed to 0.08 kg/hr (0.20% by mass with respect to the gel solid content of the hydrogel (1)). As a result, adhesion of an object to be dried to the CD dryer and aggregation or agglomeration of the objects to be dried occurred in a short time. Therefore, stirring became difficult and an overload occurred, so that the CD dryer was forced to stop and the drying was not successfully performed.

Comparative Example 2

The same operations as in Example 1 were performed except the 3.1% by mass AMPHITOL 20BS aqueous solution in Example 1 was changed to a 3.0% by mass cetyl trimethylammonium chloride (QUARTAMIN (registered trademark) 60 W, manufactured by Kao Corporation) aqueous solution, and the addition amount thereof was further changed to 0.14 kg/hr (0.20% by mass with respect to the gel solid content of the hydrogel (1)). As a result, similar to Comparative Example 1, adhesion of an object to be dried to the CD dryer and aggregation or agglomeration of the objects to be dried occurred in a short time. Therefore, stirring became difficult and an overload occurred, so that the CD dryer was forced to stop and the drying was not successfully performed.

Comparative Example 3

Comparative water-absorbent resin powder (3) and a comparative water-absorbing agent (3) were obtained by performing the same operations as in Example 1, except the addition amount of AMPHITOL 20BS in Example 1 was changed from 0.14 kg/hr to 0.75 kg/hr (from 0.20% by mass to 1.10% by mass with respect to the gel solid content of the hydrogel (1)). The moisture content of the obtained comparative water-absorbent resin powder (3) was 1.5% by mass. In addition, various physical properties of the comparative water-absorbing agent (3) are shown in Table 1.

Example 8

The particulate hydrogel (1) obtained in Production Example (1) described above was dried as follows. As a drying device, a stirring type dryer having a capacity of 110 L (Solidaire, model SJS-10-6, manufactured by HOSOKAWA MICRON CORPORATION) was used. The Solidaire is a horizontal cylindrical dryer, has an inner diameter of 0.25 m, and is provided with a shaft (diameter: 0.1 m) at a center portion of the dryer and with a jacket at the outer circumference of the dryer. The temperatures of the shaft and the jacket were adjusted to 180° C. in advance, and the rotation speed of the shaft was set to 600 rpm.

First, a 3.1% by mass lauryl dimethylamino acetic acid betaine (AMPHITOL (registered trademark) 20BS, manufactured by Kao Corporation) aqueous solution was prepared as a drying aid solution. Subsequently, the particulate hydrogel (1) was continuously fed to the Solidaire using a uniaxial shaftless screw (Accurate Feeder, manufactured by KUMA engineering Co., LTD.) while the AMPHITOL 20BS aqueous solution was being added to the particulate hydrogel (1). The gel temperature of the particulate hydrogel (1) immediately before the drying aid solution was added was 50° C. The processed amount of the particulate hydrogel (1) was 45 kg/hr, and the addition amount of the AMPHITOL 20BS aqueous solution was 1.36 kg/hr. In addition, the amount of the lauryl dimethylamino acetic acid betaine with respect to the gel solid content of the hydrogel (1) was 0.20% by mass.

In the drying, dry air heated to 180° C. was blown into the Solidaire at 1.0 m³/min in a direction opposite to the direction in which the contents advanced, thereby performing continuous drying. A particulate dried polymer (8) having a solid content 94.0% by mass was obtained by the drying operations.

The retained amount of the particulate hydrogel (1) within the Solidaire was 2 kg, and the average retention time thereof was 5 minutes.

Subsequently, the obtained particulate dried polymer (8) was pulverized using a roll mill and then classified using JIS standard sieves having opening sizes of 850 μm and 150 μm, respectively. By the pulverization and the classification, water-absorbent resin powder (8) having a particle diameter of not less than 150 μm and less than 850 μm was obtained. The moisture content of the obtained water-absorbent resin powder (8) was 6.0% by mass.

Next, a surface-crosslinking agent solution containing 0.025 parts by mass of ethylene glycol diglycidyl ether, 0.4 parts by mass of 1,4-butanediol, 0.6 parts by mass of propylene glycol, and 3.0 parts by mass of deionized water was added to 100 parts by mass of the water-absorbent resin powder (8), and the mixture was mixed such that the mixture was uniform. Thereafter, the mixture was heated at 190° C. for 30 minutes and then forcibly cooled to 60° C.

A water-absorbing agent (8) was obtained by the above series of operations. Various physical properties of the water-absorbing agent (8) are shown in Table 1.

Example 9

Water-absorbent resin powder (9) and a water-absorbing agent (9) were obtained by performing the same operations as in Example 1, except the addition amount of AMPHITOL 20BS in Example 1 was changed from 0.14 kg/hr to 0.36 kg/hr (from 0.20% by mass to 0.50% by mass with respect to the gel solid content of the hydrogel (1)). The moisture content of the obtained water-absorbent resin powder (9) was 1.3% by mass. In addition, various physical properties of the water-absorbing agent (9) are shown in Table 1.

Example 10

Water-absorbent resin powder (10) and a water-absorbing agent (10) were obtained by performing the same operations as in Example 1, except the 3.1% by mass AMPHITOL 20BS aqueous solution in Example 1 was changed to a 3.4% by mass lauryl dimethylamino acetic acid betaine (NISSANANON (registered trademark) BL, manufactured by NOF Corporation) aqueous solution, and the addition amount thereof was further changed to 0.13 kg/hr (0.20% by mass with respect to the gel solid content of the hydrogel (1)). The moisture content of the obtained water-absorbent resin powder (10) was 1.8% by mass. In addition, various physical properties of the water-absorbing agent (10) are shown in Table 2.

Example 11

Water-absorbent resin powder (11) and a water-absorbing agent (11) were obtained by performing the same operations as in Example 1, except the 3.1% by mass AMPHITOL 20BS aqueous solution in Example 1 was changed to a 3.5% by mass lauryl dimethylamino acetic acid betaine (Obazoline (registered trademark) LB-SF, manufactured by TOHO Chemical Industry Co., Ltd.) aqueous solution, and the addition amount thereof was further changed to 0.13 kg/hr (0.20% by mass with respect to the gel solid content of the hydrogel (1)). The moisture content of the obtained water absorbent resin powder (11) was 1.8% by mass. In addition, various physical properties of the waterabsorbing agent (11) are shown in Table 2.

Example 12

Water-absorbent resin powder (12) and a water-absorbing agent (12) were obtained by performing the same operations as in Example 1, except the 3.1% by mass AMPHITOL 20BS aqueous solution in Example 1 was changed to a 3.5% by mass lauryl dimethylamino acetic acid betaine (NISSANANON (registered trademark) BL-SF, manufactured by NOF Corporation) aqueous solution, and the addition amount thereof was further changed to 0.13 kg/hr (0.20% by mass with respect to the gel solid content of the hydrogel (1)). The moisture content of the obtained water-absorbent resin powder (12) was 1.9% by mass. In addition, various physical properties of the water-absorbing agent (12) are shown in Table 2.

Example 13

Water-absorbent resin powder (13) and a water-absorbing agent (13) were obtained by performing the same operations as in Example 1, except the 3.1% by mass AMPHITOL 20BS aqueous solution in Example 1 was changed to a 3.1% by mass lauric acid amide propyl betaine (RIKABION (registered trademark) B-300, manufactured by New japan Chemical Co., Ltd,) aqueous solution, and the addition amount thereof was further changed to 0.15 kg/hr (0.20% by mass with respect to the gel solid content of the hydrogel (1)). The moisture content of the obtained water-absorbent resin powder (13) was 2.0% by mass. In addition, various physical properties of the water-absorbing agent (13) are shown in Table 2.

Example 14

Water-absorbent resin powder (14) and a water-absorbing agent (14) were obtained by performing the same operations as in Example 1, except the 3.1% by mass AMPHITOL 20BS aqueous solution in Example 1 was changed to a 2.8% by mass lauric acid amide propyl betaine (NISSANANON (registered trademark) BDL-SF, manufactured by NOF Corporation) aqueous solution, and the addition amount thereof was further changed to 0.16 kg/hr (0.20% by mass with respect to the gel solid content of the hydrogel (1)). The moisture content of the obtained water-absorbent resin powder (14) was 1.8% by mass. In addition, various physical properties of the water-absorbing agent (14) are shown in Table 2.

Comparative Example 4

The same operations as in Example 1 were performed except the 3.1% by mass AMPHITOL 20BS aqueous solution in Example 1 was changed to a 9.9% by mass stearyl amine acetate (ACETAMIN (registered trademark) 86, manufactured by Kao Corporation) aqueous solution, and the addition amount thereof was further changed to 0.11 kg/hr (0.50% by mass with respect to the gel solid content of the hydrogel (1)). As a result, similar to Comparative Example 1, adhesion of an object to be dried to the CD dryer and aggregation or agglomeration of the objects to be dried occurred in a short time. Therefore, stirring became difficult and an overload occurred, so that the CD dryer was forced to stop and the drying was not successfully performed.

Comparative Example 5

The same operations as in Example 1 were performed except the 3.1% by mass AMPHITOL 20BS aqueous solution in Example 1 was changed to a 10.0% by mass sodium lauryl glycol carboxylate (BEAULIGHT (registered trademark) SHAA, manufactured by Sanyo Chemical Industries, Ltd.) aqueous solution, and the addition amount thereof was further changed to 0.11 kg/hr (0.50% by mass with respect to the gel solid content of the hydrogel (1)). As a result, similar to Comparative Example 1, adhesion of an object to be dried to the CD dryer and aggregation or agglomeration of the objects to be dried occurred in a short time. Therefore, stirring became difficult and an overload occurred, so that the CD dryer was forced to stop and the drying was not successfully performed.

Comparative Example 6

The same operations as in Example 1 were performed except the 3.1% by mass AMPHITOL 20BS aqueous solution in Example 1 was changed to a 3.5% by mass lauryl dimethyl amine oxide (AMPHITOL (registered trademark) 20N, manufactured by Kao Corporation) aqueous solution, and the addition amount thereof was further changed to 0.32 kg/hr (0.50% by mass with respect to the gel solid content of the hydrogel (1)). As a result, similar to Comparative Example 1, adhesion of an object to be dried to the CD dryer and aggregation or agglomeration of the object to be dried occurred in a short time. Therefore, stirring became difficult and an overload occurred, so that the CD dryer was forced to stop and the drying was not successfully performed.

Comparative Example 7

Comparative water-absorbent resin powder (7) and a comparative water-absorbing agent (7) were obtained by performing the same operations as in Example 1, except the addition amount of AMPHITOL 20BS in Example 1 was changed from 0.14 kg/hr to 0.51 kg/hr (from 0.20% by mass to 0.70% by mass with respect to the gel solid content of the hydrogel (1)). The moisture content of the obtained comparative water-absorbent resin powder (7) was 1.7% by mass. In addition, various physical properties of the comparative water-absorbing agent (7) are shown in Table 2.

Comparative Example 8

The same operations as in Example 1 were performed except the 3.1% by mass AMPHITOL 20BS aqueous solution in Example 1 was changed to a 10.0% by mass polyethylene glycol 600 (weight-average molecular weight: 570 to 630) aqueous solution, and the addition amount thereof was further changed to 0.11 kg/hr (0.50% by mass with respect to the gel solid content of the hydrogel (1)). As a result, similar to Comparative Example 1, adhesion of an object to be dried to the CD dryer and aggregation or agglomeration of the object to be dried occurred in a short time. Therefore, stirring became difficult and an overload occurred, so that the CD dryer was forced to stop and the drying was not successfully performed.

Comparative Example 9

Comparative water-absorbent resin powder (9) and a comparative water-absorbing agent (9) were obtained by performing the same operations as in Example 1, except the 3.1% by mass AMPHITOL 20BS aqueous solution in Example 1 was changed to a 10.0% by mass polyethylene glycol 20000 (weight-average molecular weight: 20000±5000) aqueous solution, and the addition amount thereof was further changed to 0.11 kg/hr (0.50% by mass with respect to the gel solid content of the hydrogel (1)). The moisture content of the obtained comparative water-absorbent resin powder (9) was 7.9% by mass. In addition, various physical properties of the comparative water-absorbing agent (9) are shown in Table 2. In a comparative dried polymer (9) discharged from the CD dryer, bulky particles the interiors of which were in an undried state (hereinafter, "undried matter") were included. Thus, when the comparative dried polymer (9) was pulverized using the roll mill, the undried matter adhered to the roll mill, and the roll mill often sopped due to overload.

Comparative Example 10

The same operations as in Example 1 were performed except the 3.1% by mass AMPHITOL 20BS aqueous solution in Example 1 was changed to a 10.0% by mass polyoxyethylene sorbitan monostearate (RHEODOL SUPER (registered trademark) S120V, manufactured by Kao Corporation) aqueous solution, and the addition amount thereof was further changed to 0.11 kg/hr (0.50% by mass with respect to the gel solid content of the hydrogel (1)). As a result, similar to Comparative Example 1, adhesion of an object to be dried to the CD dryer and aggregation or agglomeration of the objects to be dried occurred in a short time. Therefore, stirring became difficult and an overload occurred, so that the CD dryer was forced to stop and the drying was not successfully performed.

TABLE 1

Specifications and Evaluation Results of Examples and Comparative Examples

| | Unit | Ex. 1 | Ex. 2 | Ex. 3 | Ex. 4 | Ex. 5 | Ex. 6 |
|---|---|---|---|---|---|---|---|
| Drying device | | CD dryer | CD dryer | CD dryer | CD dryer | CD dryer | CD dryer |
| Drying temperature | [° C.] | 180 | 180 | 180 | 180 | 180 | 180 |
| Rotation speed | [rpm] | 30 | 30 | 30 | 30 | 30 | 30 |
| Paticulate hydrogel Gel temperature | [° C.] | 55 | 54 | 61 | 60 | 57 | 55 |
| Processed amount | [kg/hr] | 4.5 | 4.5 | 4.5 | 4.5 | 4.5 | 4.5 |
| Drying aid | | AMPHITOL 20BS | AMPHITOL 20AB | AMPHITOL 20YB | AMPHITOL 86B | AMPHITOL 55AB | AMPHITOL 20HD |
| Addition amount | [kg/hr] | 0.14 | 0.14 | 0.08 | 0.02 | 0.03 | 0.03 |
| Addition amount | [wt %] | 0.20 | 0.20 | 0.15 | 0.02 | 0.04 | 0.04 |
| Drying enablement | | Possible | Possible | Possible | Possible | Possible | Possible |
| Dried polymer | [wt %] | 98.3 | 98.0 | 98.0 | 97.3 | 97.5 | 97.5 |
| CRC | [g/g] | 47 | 47 | 45 | 44 | 45 | 45 |
| Water-absorbing agent | | Water-absorbing agent (1) | Water-absorbing agent (2) | Water-absorbing agent (3) | Water-absorbing agent (4) | Water-absorbing agent (5) | Water-absorbing agent (6) |
| CRC | [g/g] | 37 | 36 | 36 | 34 | 34 | 36 |
| AAP under 2.06 kPa | [g/g] | 31 | 32 | 32 | 33 | 33 | 32 |
| Color tone (WB) | [−] | 73 | 72 | 70 | 70 | 73 | 72 |

| | Unit | Ex. 7 | Comp. Ex. 1 | Comp. Ex. 2 | Comp. Ex. 3 | Ex. 8 | Ex. 9 |
|---|---|---|---|---|---|---|---|
| Drying device | | CD dryer | CD dryer | CD dryer | CD dryer | Solidaire | CD dryer |
| Drying temperature | [° C.] | 180 | 180 | 180 | 180 | 180 | 180 |
| Rotation speed | [rpm] | 30 | 30 | 30 | 30 | 600 | 30 |
| Paticulate hydrogel Gel temperature | [° C.] | 55 | 60 | 60 | 54 | 50 | 54 |
| Processed amount | [kg/hr] | 4.5 | 4.5 | 4.5 | 4.5 | 4.5 | 4.5 |
| Drying aid | | NISSANANON LA | Trimethyl glycine | QUARTAMIN 60W | AMPHITOL 20BS | AMPHITOL 20BS | AMPHITOL 20BS |
| Addition amount | [kg/hr] | 0.15 | 0.08 | 0.14 | 0.75 | 1.36 | 0.36 |
| Addition amount | [wt %] | 0.20 | 0.20 | 0.20 | 1.10 | 0.20 | 0.50 |
| Drying enablement | | Possible | Impossible | Impossible | Possible | Possible | Possible |
| Dried polymer | [wt %] | 98.0 | — | — | 98.5 | 94.0 | 98.7 |
| CRC | [g/g] | 47 | — | — | 50 | 35 | 48 |
| Water-absorbing agent | | Water-absorbing agent (7) | — | — | Comp water-absorbing agent (3) | Water-absorbing agent (8) | Water-absorbing agent (9) |
| CRC | [g/g] | 37 | — | — | 39 | 29 | 38 |
| AAP under 2.06 kPa | [g/g] | 31 | — | — | 26 | 30 | 30 |
| Color tone (WB) | [−] | 71 | — | — | 68 | 74 | 70 |

TABLE 2

Specifications and Evaluation Results of Examples and Comparative Examples

| | Unit | Ex. 10 | Ex. 11 | Ex. 12 | Ex. 13 | Ex. 14 | Comp. Ex. 4 |
|---|---|---|---|---|---|---|---|
| Drying device | | CD dryer | CD dryer | CD dryer | CD dryer | CD dryer | CD dryer |
| Drying temperature | [° C.] | 180 | 180 | 180 | 180 | 180 | 180 |
| Rotation speed | [rpm] | 30 | 30 | 30 | 30 | 30 | 30 |
| Paticulate hydrogel Gel temperature | [° C.] | 57 | 57 | 60 | 62 | 54 | 61 |
| Processed amount | [kg/hr] | 4.5 | 4.5 | 4.5 | 4.5 | 4.5 | 4.5 |
| Drying aid | | NISSANANON BL | Obazoline LB-SF | NISSANANON BL-SF | RIXABION B-300 | NISSANANON BDL-SF | ACETAMIN 86 |
| Addition amount | [kg/hr] | 0.13 | 0.13 | 0.13 | 0.15 | 0.16 | 0.11 |
| Addition amount [with respect to gel solid content] | [wt %] | 0.20 | 0.20 | 0.20 | 0.20 | 0.20 | 0.50 |
| Drying enablement | | Possible | Possible | Possible | Possible | Possible | Impossible |
| Dried polymer Solid content | [wt %] | 98.2 | 98.2 | 98.1 | 98.0 | 98.2 | — |
| CRC | [g/g] | 47 | 47 | 46 | 46 | 47 | — |
| Water absorbing agent | | Water-absorbing agent (10) | Water-absorbing agent (11) | Water-absorbing agent (12) | Water-absorbing agent (13) | Water-absorbing agent (14) | — |

TABLE 2-continued

Specifications and Evaluation Results of Examples and Comparative Examples

| | | | | | | |
|---|---|---|---|---|---|---|
| CRC | [g/g] | 37 | 37 | 37 | 37 | 37 | — |
| AAP 2.06 kPa | [g/g] | 31 | 31 | 32 | 31 | 31 | — |
| Color tone (WB) | [—] | 72 | 73 | 73 | 73 | 72 | — |

| | Unit | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|
| Drying device | | CD dryer | CD dryer | CD dryer | CD dryer | CD dryer | CD dryer |
| Drying temperature | [° C.] | 180 | 180 | 180 | 180 | 180 | 180 |
| Rotation speed | [rpm] | 30 | 30 | 30 | 30 | 10 | 30 |
| Particulate hydrogel Gel temperature | [° C.] | 57 | 57 | 55 | 59 | 59 | 61 |
| Processed amount | [kg/hr] | 4.5 | 4.5 | 4.5 | 4.5 | 4.5 | 4.5 |
| Drying aid | | BEAULIGHT SHAA | AMPHITOL 20N | AMPHITOL 20BS | PEG600 | PEG20000 | RHEODOL SUPER S120V |
| Addition amount | [kg/hr] | 0.11 | 0.32 | 0.51 | 0.11 | 0.11 | 0.11 |
| Addition amount [with respect to gel solid content] | [wt %] | 0.50 | 0.50 | 0.70 | 0.50 | 0.50 | 0.50 |
| Drying enablement | | Impossible | Impossible | Possible | Impossible | Possible | Impossible |
| Dried polymer Solid content | [wt %] | — | — | 98.3 | — | 92.1 | — |
| CRC | [g/g] | — | — | 48 | — | 36 | — |
| Water absorbing agent | | — | — | Comparative water-absorbing agent (7) | — | Comparative water-absorbing agent (9) | — |
| CRC | [g/g] | — | — | 38 | — | 29 | — |
| AAP 2.06 kPa | [g/g] | — | — | 28 | — | 28 | — |
| Color tone (WB) | [—] | — | — | 69 | — | 73 | — |

CONCLUSION

As shown in Tables 1 and 2, in Examples 1 to 14 in which the drying aid having the specific structure defined in claim 1 of the present application was added, high gel dispersibility was achieved even when the addition amount of the drying aid was small, and stirring drying was efficiently performed. On the other hand, as shown in Comparative Example 1, even when trimethyl glycine, which is a betaine but does not have the above specific structure, was added, the gel dispersibility was so low that stirring drying became difficult, and thus the drying was not successfully performed. In addition, as shown in Comparative Example 2, even when the quaternary ammonium salt was added, the gel dispersibility was so low that stirring drying became difficult, and thus the drying was not successfully performed. Moreover, for example, even though the addition amount in Example 1 is not greater than one-fifth of that in Comparative Example 3, the gel dispersibility was good in Example 1, and the stirring drying was efficiently performed. On the other hand, in Comparative Example 3 and Comparative Example 7 in which the addition amount was greater than 0.5% by mass, as compared to Examples 1 and 9 in which the addition amount was not greater than 0.5% by mass, the color tone (WB) of the water-absorbing agent after surface-crosslinking greatly decreased, and the water absorption capacity under load (AAP) also significantly decreased.

In Comparative Examples 4 to 6, although the compound having a structure similar to that of the drying aid used in Examples 1 to 14 was used, since the compound does not have the above specific structure, desired gel dispersibility was not exhibited with an addition amount of 0.5% by mass, and the stirring drying was not successfully performed. In Comparative Examples 8 to 10, although the polyethylene glycols and the non-ionic surfactant, which are conventionally used, were added, desired gel dispersibility was not exhibited with, an addition amount of 0.5% by mass, so that the drying was not successfully performed or a water-absorbing agent having merely low water absorption performance was obtained.

As shown above in Examples 1 to 14 and Comparative Examples 1 to 10, advantages (improvement in physical properties, improvement in drying efficiency, reduction in pulverization load, etc.) of the present invention, in which surface-crosslinking of obtained water-absorbent resin powder is performed after a crosslinked hydrogel polymer containing a specific drying aid in a specific amount (that is, an intermediate composition) is dried, are clear. With the production method according to the present invention, a water-absorbing agent having excellent physical properties can be efficiently produced.

INDUSTRIAL APPLICABILITY

The water-absorbing agent obtained by the present invention is suitable for application as an absorbent body for sanitary articles such as disposable diapers and the like. The intermediate composition according to the present invention enhances the productivity and the physical properties of the water-absorbing agent obtained with the crosslinked hydrogel polymer as an intermediate.

The invention claimed is:

1. A method for producing a water-absorbing agent, the method comprising;
    a polymerization step of polymerizing a monomer aqueous solution to obtain a crosslinked hydrogel polymer; and
    a drying step of obtaining a particulate dried polymer by drying a particulate crosslinked hydrogel polymer containing a drying aid that is obtained by adding the drying aid to the crosslinked hydrogel polymer after the polymerization step;

the drying step is a material stirring type drying step where adjacent particles are sequentially changed and come into contact with another particle during the stirring type drying step;

the material stirring type drying step is performed by a stirring type drying device, the stirring type drying device comprising a rotating stirring board and/or a rotating cylinder, wherein the particulate crosslinked hydrogel polymer is stirred by the rotating stirring board and/or the particulate crosslinked hydrogel polymer is placed in the rotating cylinder and stirred during the material stirring type drying step, the drying aid is selected from the group consisting of compounds represented by general formulas (1) to (3) below,

[Chem.1]

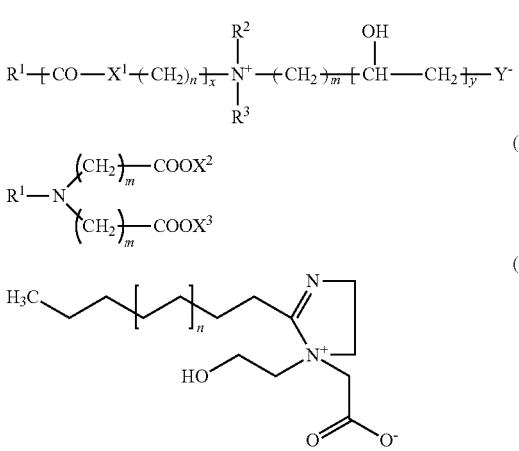

wherein, in formulas (1) and (2), R1 is a saturated alkyl group having 8 to 20 carbon atoms or an alkyl group having a hydroxyl group and having 8 to 20 carbon atoms, and "m" is an integer not less than 1 and not greater than 6, in formula (1), $X^1$ is NH, $NR^4$ having an alkyl group $R^4$ having 1 to 4 carbon atoms, O, or S, "x" is 0 or 1, $R^2$ and $R^3$ are each independently an alkyl group having 1 to 4 carbon atoms or an alkyl group having a hydroxyl group at an end thereof and having 1 to 4 carbon atoms, "y" is 0 or 1, Y is COO, $SO_3$, $OPO(OR^5)O$, or $P(O)$ $(OR^5)O$, and $R^5$ is a hydrogen atom or an alkyl group having 1 to 4 carbon atoms, in formula (2), $X^2$ and $X^3$ are each independently a hydrogen atom, an alkali metal, or ammonium (excluding the case where $X^2$ and $X^3$ are each a hydrogen atom), and in formulas (1) and (3), "n" is an integer not less than 1 and not greater than 6, an addition amount of the drying aid with respect to a gel solid content of the particulate crosslinked hydrogel polymer is 0.001% by mass to 0.5% by mass, and surface-crosslinking is performed on water-absorbent resin powder obtained through the drying step.

2. The method according to claim 1, wherein the particulate crosslinked hydrogel polymer to be supplied in the drying step has a particle diameter of not less than 25 μm and not greater than 2000 μm.

3. The method according to claim 1, further comprising a gel pulverization step of performing gel pulverization on the crosslinked hydrogel polymer before the drying step, wherein the drying aid is added after the gel pulverization step.

4. The method according to claim 1, wherein the particulate crosslinked hydrogel polymer to be supplied in the drying step has a polymerization ratio of not less than 70% by mass and has gel Ext of not greater than 20% by mass.

5. The method according to claim 1, wherein the particulate crosslinked hydrogel polymer to be supplied in the drying step has a particle diameter of not less than 25 μm and not greater than 2000 μm.

6. The method according to claim 1, further comprising a gel pulverization step of performing gel pulverization on the crosslinked hydrogel polymer before the drying step, wherein the drying aid is added after the gel pulverization step.

7. The method according to claim 1, wherein the particulate crosslinked hydrogel polymer to be supplied in the drying step has a polymerization ratio of not less than 70% by mass and has gel Ext of not greater than 20% by mass.

8. The method of claim 1, wherein the stirring type drying device comprises the rotating stirring board and the particulate crosslinked hydrogel polymer is stirred by the rotating stirring board.

9. The method of claim 1, wherein the stirring type drying device comprises the rotating cylinder and the particulate crosslinked hydrogel polymer is placed in the rotating cylinder, and stirred by rotation of the rotating cylinder.

10. The method of claim 8, wherein the particulate crosslinked hydrogel polymer flows through the stirring type drying device by the rotating stirring board.

11. The method of claim 9, wherein the particulate crosslinked hydrogel polymer flows through the rotating cylinder of the stirring type drying device by rotation of the cylinder.

* * * * *